US012104818B2

(12) United States Patent
Honda et al.

(10) Patent No.: US 12,104,818 B2
(45) Date of Patent: Oct. 1, 2024

(54) AIR-CONDITIONING APPARATUS

(71) Applicant: Mitsubishi Electric Corporation, Tokyo (JP)

(72) Inventors: Kazuya Honda, Tokyo (JP); Soshi Ikeda, Tokyo (JP); Jun Nishio, Tokyo (JP); Yuki Mizuno, Tokyo (JP); Katsuhiro Ishimura, Tokyo (JP); Yuji Motomura, Tokyo (JP); Kosuke Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 501 days.

(21) Appl. No.: 17/425,323

(22) PCT Filed: Feb. 27, 2019

(86) PCT No.: PCT/JP2019/007628
§ 371 (c)(1),
(2) Date: Jul. 23, 2021

(87) PCT Pub. No.: WO2020/174618
PCT Pub. Date: Sep. 3, 2020

(65) Prior Publication Data
US 2022/0090815 A1    Mar. 24, 2022

(51) Int. Cl.
*F24F 11/86* (2018.01)
*F25B 40/02* (2006.01)

(52) U.S. Cl.
CPC .............. *F24F 11/86* (2018.01); *F25B 40/02* (2013.01)

(58) Field of Classification Search
CPC ................................. F24F 11/86; F25B 40/02
See application file for complete search history.

(56) References Cited

U.S. PATENT DOCUMENTS 6,237,356 B1 *  5/2001  Hori ...................... F25D 17/02
                                                   62/324.1
8,881,548 B2   11/2014  Wakamoto et al.
(Continued)

FOREIGN PATENT DOCUMENTS

EP   3379176 A1   9/2018
JP   5-5406 Y2    2/1993
(Continued)

OTHER PUBLICATIONS

Extended European Search Report dated Feb. 4, 2022 issued in corresponding European patent application No. 19917030.9, 8 pp.
(Continued)

*Primary Examiner* — Henry T Crenshaw
(74) *Attorney, Agent, or Firm* — XSENSUS LLP

(57) ABSTRACT

An air-conditioning apparatus includes: a heat source unit that generates a heating energy or a cooling energy that is transferred to refrigerant; a heat-use unit that causes the refrigerant to transfer the heating energy or the cooling energy to a heat load through heat exchange between the refrigerant and the heat load; a plurality of return pipes arranged parallel to each other and connecting the heat source unit and the heat-use unit to allow the refrigerant to flow therein from the heat-use unit to the heat source unit; an opening and closing device provided at at least one of the return pipes to control a flow rate of refrigerant; and a controller that opens the opening and closing device in a cooling operation, and closes the opening and closing device in a heating operation.

20 Claims, 10 Drawing Sheets

(56) References Cited

U.S. PATENT DOCUMENTS

| | | | |
|---|---|---|---|
| 9,303,906 B2 | 4/2016 | Morimoto et al. | |
| 2011/0056384 A1* | 3/2011 | Kadota | F24F 3/1417 236/44 A |
| 2016/0003490 A1* | 1/2016 | Motomura | F25B 13/00 62/196.1 |

FOREIGN PATENT DOCUMENTS

| | | |
|---|---|---|
| JP | 9-133443 A | 5/1997 |
| JP | 2000-161805 A | 6/2000 |
| JP | 2011-52883 A | 3/2011 |
| JP | 2015-158326 A | 9/2015 |
| WO | 2017/085888 A1 | 5/2017 |

OTHER PUBLICATIONS

International Search Report and Written Opinion mailed on Apr. 2, 2019, received for PCT Application PCT/JP2019/007628, Filed on Feb. 27, 2019, 9 pages including English Translation.
Office Action issued on May 12, 2022, in corresponding Chinese patent Application No. 201980092497.5, 21 pages.
European Office Action issued May 10, 2023 in corresponding European Patent Application No. 19917030.9, 6 pages.

* cited by examiner

AIR-CONDITIONING APPARATUS

CROSS-REFERENCE TO RELATED APPLICATION

The present application is based on PCT filing PCT/JP2019/007628, filed Feb. 27, 2019, the entire contents of which is incorporated herein by reference.

TECHNICAL FIELD

The present disclosure relates to an air-conditioning apparatus, and in particular, to improvement of the configuration of a refrigerant cycle circuit.

BACKGROUND ART

Air-conditioning apparatuses are present in which a heat exchanger and other components are provided to form a refrigerant cycle circuit, and refrigerant is circulated therein to cause a heating operation or a cooling operation to be performed, thereby air-conditioning an indoor space that is an air-conditioned space. Among the air-conditioning apparatuses, in a well-known air-conditioning apparatus (as disclosed in, for example, Patent Literature 1), a refrigerant cycle circuit is configured such that when refrigerant passes through the heat exchanger during either the heating operation or the cooling operation, the refrigerant flows in a direction from a leeward side toward a windward side in the flow of an indoor air that is a heat-use fluid (the flows of the above refrigerant and air will hereinafter be referred to as counterflow). When the refrigerant flows in the opposite direction to the flow direction of the heat-use fluid, that is, the flows of the refrigerant and the heat-use fluid are counterflow, the heat exchange efficiency in the heat exchanger can be improved.

CITATION LIST

Patent Literature

Patent Literature 1: International Publication No. 2017/085888

SUMMARY OF INVENTION

Technical Problem

The air-conditioning apparatus described in Patent Literature 1 includes an indoor heat exchanger, an outdoor heat exchanger, a six-way valve, a compressor, and an expansion device, and the refrigerant cycle circuit is configured to cause refrigerant to flow in the indoor heat exchanger in a direction where counterflow is achieved, whichever of a heating operation and a cooling operation is performed In the air-conditioning apparatus of Patent Literature 1, the refrigerant in a use-side heat exchanger flows in a direction where counterflow is achieved. However, in the air-conditioning apparatus of Patent Literature 1, a thick pipe is required to reduce a pressure loss during the cooling operation. Thus, during the heating operation, since liquid refrigerant that is liquefied refrigerant flows, the amount of the refrigerant to be used is increased. In particular, when a zeotropic refrigerant mixture is used as the refrigerant, the performance may be deteriorated.

The present disclosure is applied to solve the above problem, and relates to an air-conditioning apparatus that can cause heat exchange to be efficiently performed regardless of which operation is performed, for example, which of a heating operation and a cooling operation is performed.

Solution to Problem

An air-conditioning apparatus according to an embodiment of the present disclosure includes a heat source unit that generates a heating energy or a cooling energy and transfers the heating energy or the cooling energy to refrigerant; a heat-use unit that causes the refrigerant to transfer the heating energy or the cooling energy transferred from the heat source unit to a heat load through heat exchange between the refrigerant and the heat load; a supply pipe connecting the heat source unit and the heat-use unit to allow the refrigerant to flow from the heat source unit to the heat-use unit; a plurality of return pipes arranged parallel to each other, the return pipes connecting the heat source unit and the heat-use unit to allow the refrigerant to flow therein from the heat-use unit to the heat source unit; an opening and closing device provided at at least one of the return pipes to control a flow rate of refrigerant that passes through the return pipe; and a controller that opens the opening and closing device in a cooling operation, and closes the opening and closing device in a heating operation.

Advantageous Effects of Invention

According to an embodiment of the present disclosure, the supply pipe in which refrigerant flows from the heat source unit side to the use unit side and the return pipes in which the refrigerant flows from the use unit side to the heat source unit side are provided. Thus, during heating and cooling operations, because the flow direction of the refrigerant in the use unit is kept unchanged and heat exchange with the refrigerant in the use unit is carried out such that counterflow is achieved, the efficiency in the use unit can be improved. In this case, the plurality of return pipes are provided and the opening and closing device is provided at at least one of the plurality of pipes. By closing the opening and closing device under control by the controller, the total flow passage area of the return pipes can be reduced. As a result, by closing the opening and closing device during the heating operation, the amount of refrigerant to be used can be reduced.

DESCRIPTION OF EMBODIMENTS

Figure 1:
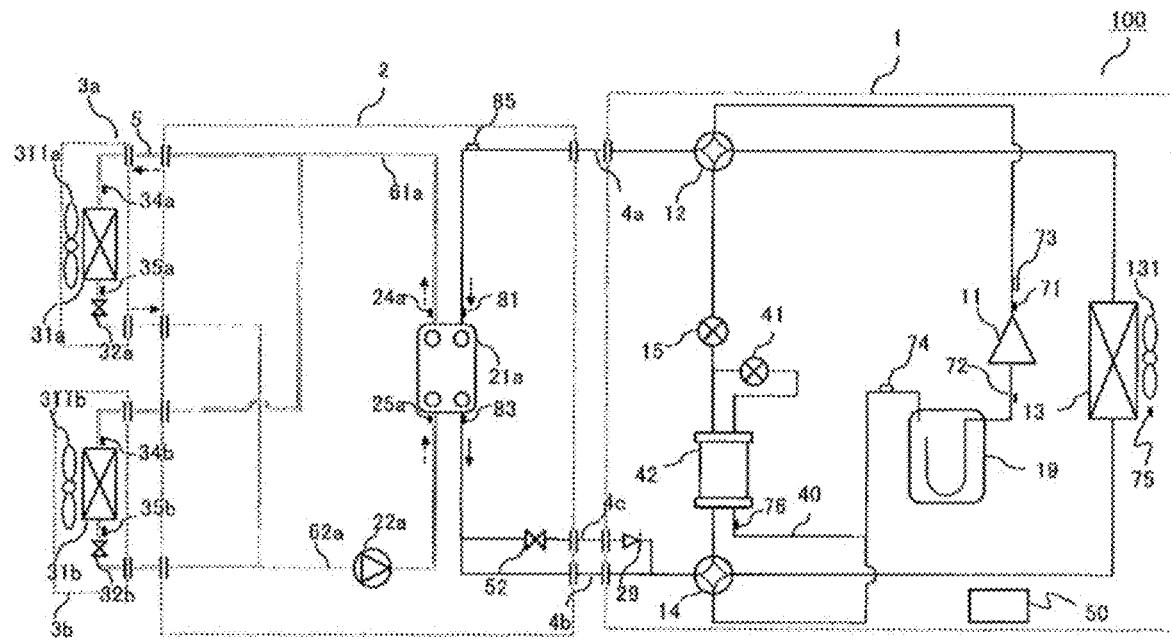
FIG. 1 is a schematic diagram illustrating an example of the configuration of circuits and other components in an air-conditioning apparatus according to Embodiment 1 of the present disclosure.

An air-conditioning apparatus according to each of embodiments of the present disclosure will be explained with reference to the drawings. In each of the figures in the drawings, components that are the same as or equivalent to those in a previous figure or figures are denoted by the same reference signs. The same is true of the entire text of the present specification. Furthermore, the configurations of components described in the specification are merely examples; that is, the actual configurations of the components are not limited to the configurations described in the specification. In particular, in the case where components are combined, it is not limited to the case where components according to the same embodiment are combined. A component in an embodiment can be applied to another embodiment. Moreover, in the figures, a relationship between sizes of components as illustrated in the figures may be different from that between actual sizes of the components. In addition, the levels of temperature, pressure, etc., are not determined in relation to absolute values, that is, they are relatively determined in accordance with the state and operation of the apparatus or components, for example.

Embodiment 1

[Air-Conditioning Apparatus]

FIG. 1 is a schematic diagram illustrating an example of the configuration of each of circuits, etc. in an air-conditioning apparatus according to Embodiment 1 of the present disclosure. An air-conditioning apparatus 100 according to Embodiment 1 includes, as separate units, an outdoor unit 1, a relay unit 2, and a plurality of indoor units 3. The relay unit 2 serves as a relay device that causes heat exchange to be performed between refrigerant and a medium (hereinafter referred to a heat medium), which is different from the refrigerant and carries heat, and operates as a relay for transfer of heat. The air-conditioning apparatus 100 includes a refrigerant cycle circuit in which the outdoor unit 1 and the relay unit 2 are connected by a supply pipe 4a and return pipes 4b and 4c, and a heat-medium cycle circuit in which the relay unit 2 and the indoor units 3 are connected by heat medium pipes 5. Although FIG. 1 illustrates by way of example the case where two indoor units 3a and 3b are connected to the relay unit 2, the number of indoor units 3 may be two or more.

In this case, a zeotropic refrigerant mixture is used as refrigerant, though the refrigerant is not limited to a specific one. Of refrigerants in which multiple refrigerant components are mixed, a zeotropic refrigerant mixture is refrigerant whose composition varies when the refrigerant evaporates or condenses. When the composition varies, the temperature of the zeotropic refrigerant mixture is not constant even when the zeotropic refrigerant mixture is in a two-phase gas-liquid state under the same pressure. For this reason, in a heat exchanger, a condensing end temperature (boiling point) becomes lower than a condensing start temperature (dew point), for example. A temperature change width between the dew point and the boiling point is a temperature gradient. In addition to a zeotropic refrigerant mixture, a single-component refrigerant, an azeotropic refrigerant mixture or a pseudo-azeotropic refrigerant mixture may be used.

[Outdoor Unit 1]

The outdoor unit 1 is, for example, installed outside a room that is an air-conditioned space, and operates as a heat source unit that transfers or supplies heat for air-conditioning to the outside. The outdoor unit 1 includes, for example, a compressor 11, a first flow switching device 12, a heat-source-side heat exchanger 13, a second flow switching device 14, a first expansion device 15, an accumulator 19, a bypass circuit 40, a second expansion device 41, and a refrigerant-to-refrigerant heat exchanger 42. These components are connected by pipes. In addition, the outdoor unit 1 further includes an outdoor fan 131 that sends air to the heat-source-side heat exchanger 13.

The compressor 11 sucks and compresses refrigerant into high-temperature and high-pressure refrigerant, and discharges the high-temperature and high-pressure refrigerant. The compressor 11 of Embodiment 1 is, for example, an inverter compressor whose capacity can be controlled. It should be noted that as the compressor 11 of Embodiment 1, a compressor having a low-pressure shell structure or a high-pressure shell structure can be used. The low-pressure shell structure is a structure in which a compression chamber is provided in a hermetic container in which a low refrigerant-pressure atmosphere is provided, and low-pressure refrigerant in the hermetic container is sucked into the compression chamber and compressed therein. The high-pressure shell structure is a structure in which a high refrigerant-pressure atmosphere is provided in a hermetic container, and low-pressure refrigerant in a pipe connected to a suction portion of the compressor is sucked into the compression chamber, compressed, and discharged therefrom through the inside of the hermetic container.

The first flow switching device 12 is, for example, a four-way valve or other devices. The first flow switching device 12 switches a refrigerant flow passage to be used, between a refrigerant flow passage for a cooling operation and that for a heating operation to switch the function of a heat exchanger that operates as a condenser or a gas cooler. The first flow switching device 12 is connected to a discharge side of the compressor 11, the heat-source-side heat exchanger 13, the first expansion device 15, and the supply pipe 4a. In the cooling operation, the first flow switching device 12 switches the flow passage of the refrigerant cycle circuit to the flow passage for the cooling operation such that the discharge side of the compressor 11 and the heat-source-side heat exchanger 13 communicate with each other and the first expansion device 15 and the supply pipe 4a communicate with each other. When the flow passage for the cooling operation is used, the heat-source-side heat exchanger 13 operates as a condenser or a gas cooler. By contrast, in the heating operation, the first flow switching device 12 switches the flow passage of the refrigerant cycle circuit to a flow passage for the heating operation such that the discharge side of the compressor 11 and the supply pipe 4a communicate with each other and the heat-source-side heat exchanger 13 and the first expansion device 15 communicate with each other. When the flow passage for the heating operation is used, an intermediate heat exchanger 21a operates as a condenser or a gas cooler.

The heat-source-side heat exchanger 13 causes heat exchange to be performed between outdoor air and the refrigerant. It should be noted that the heat-source-side heat exchanger 13 operates as a condenser or a gas cooler in the cooling operation and operates as an evaporator in the heating operation. The outdoor fan 131 supplies outdoor air to the heat-source-side heat exchanger 13. In this case, the outdoor air is a heat-source fluid to be subjected to heat exchange with the refrigerant in the heat-source-side heat exchanger 13. However, the heat-source fluid is not limited to the outdoor air, and may be, for example, water.

The second flow switching device 14 is, for example, a four-way valve. The second flow switching device 14 switches a refrigerant flow passage to be used, between a refrigerant flow passage for the cooling operation and that for the heating operation to switch the function of a heat exchanger that operates as an evaporator. The second flow switching device 14 is connected to a suction side of the compressor 11, the heat-source-side heat exchanger 13, the first expansion device 15, and the return pipes 4b and 4c. In the cooling operation, the second flow switching device 14 switches the flow passage of the refrigerant cycle circuit to the flow passage for the cooling operation such that the suction side of the compressor 11 and the return pipes 4b and 4c communicate with each other and the heat-source-side heat exchanger 13 and the first expansion device 15 communicate with each other. When the flow passage for the cooling operation is used, the intermediate heat exchanger 21a operates as an evaporator. By contrast, in the heating operation, the second flow switching device 14 switches the flow passage of the refrigerant cycle circuit to the flow passage for the heating operation such that the suction side of the compressor 11 and the heat-source-side heat exchanger 13 communicate with each other and the first expansion device 15 and the return pipes 4b and 4c communicate with each other. When the flow passage for heating is used, the heat-source-side heat exchanger 13 operates as an evaporator. In Embodiment 1, the second flow switching device 14 is, for example, a four-way valve. However, the second flow switching device 14 may be a combination of two-way valves, for example.

The air-conditioning apparatus 100 according to Embodiment 1 includes the supply pipe 4a and the return pipes 4b and 4c as connection pipes that connect the outdoor unit 1 and the relay unit 2. One of ends of the supply pipe 4a is connected to the first flow switching device 12 and the other is connected to a refrigerant inlet side of the intermediate heat exchanger 21a. One of ends of each of the return pipes 4b and 4c is connected to the second flow switching device 14 and the other is connected to a refrigerant outlet side pipe of the intermediate heat exchanger 21a. The return pipe 4b and the return pipe 4c are provided in parallel between the outdoor unit 1 and the relay unit 2.

The supply pipe 4a serves as a refrigerant flow passage through which low-pressure two-phase gas-liquid refrigerant flows during the cooling operation and high-pressure gas refrigerant flows during the heating operation. In addition, the refrigerant that flows through the supply pipe 4a flows in a direction from the outdoor unit 1 toward the relay unit 2 regardless of which operation is performed. The return pipe 4b serves as a refrigerant flow passage through which low-pressure two-phase gas-liquid refrigerant or gas refrigerant flows during the cooling operation and high-pressure liquid refrigerant flows during the heating operation. The return pipe 4b may have a larger diameter than the return pipe 4c. The return pipe 4c, as well as the return pipe 4b, serves as a refrigerant flow passage through which low-pressure two-phase gas-liquid refrigerant or gas refrigerant flows during the cooling operation and high-pressure liquid refrigerant flows during the heating operation. The return pipe 4c may have a larger diameter than the return pipe 4b. The return pipe 4b and the return pipe 4c may have the same diameter. In this case, the refrigerant that flows through the return pipes 4b and 4c flows in a direction from the relay unit 2 toward the outdoor unit 1 regardless of which operation is performed.

The first expansion device 15 is a device that operates as a pressure reducing valve or an expansion valve that reduces the pressure of the refrigerant to expand the refrigerant. It is appropriate that the first expansion device 15 is a device whose opening degree can be controlled, such as an electronic expansion valve. The first expansion device 15 is provided at a pipe between the first flow switching device 12 and the second flow switching device 14. Furthermore, the accumulator 19 is provided at a suction section located on a suction side of the compressor 11. The accumulator 19 stores excessive refrigerant in the refrigerant cycle circuit. It should be noted that for example, the amount of refrigerant required for air-conditioning in the heating operation is different from that in the cooling operation. Thus, the accumulator 19 stores excessive refrigerant that is generated because of the above difference between the heating operation and the cooling operation. In addition, the accumulator 19 stores excessive refrigerant that is transiently generated when the operation is changed. In this case, in the air-conditioning apparatus 100 of Embodiment 1, the accumulator 19 stores excessive refrigerant, but the device that stores excessive refrigerant is not limited to the accumulator. For example, a receiver that stores high-pressure liquid refrigerant may be provided.

The bypass circuit 40 is a pipe that allows some of high-temperature and high-pressure refrigerant to flow therein and flow toward the suction portion of the compressor 11. One of ends of the bypass circuit 40 is connected to a pipe between the second flow switching device 14 and the first expansion device 15 and the other is connected to a pipe between the compressor 11 and the second flow switching device 14. At the bypass circuit 40, the second expansion device 41 is provided. The second expansion device 41 is a device that operates as a pressure reducing valve or an expansion valve that reduces the pressure of the refrigerant to expand the refrigerant. It is appropriate that the second expansion device 41 is a device whose opening degree can be controlled, such as an electronic expansion valve. The refrigerant-to-refrigerant heat exchanger 42 is, for example, a double-pipe heat exchanger. The refrigerant-to-refrigerant heat exchanger 42 causes heat exchange to be performed between middle-temperature and high-pressure refrigerant that flows between the second flow switching device 14 and the first expansion device 15 and low-temperature and low-pressure refrigerant that flows out of the second expansion device 41 and flows through the bypass circuit 40, to thereby subcool the middle-temperature and high-pressure refrigerant.

Furthermore, the outdoor unit 1 includes a high-pressure detection sensor 73, a discharge temperature sensor 71, a suction temperature sensor 72, a low-pressure detection sensor 74, a refrigerant-to-refrigerant heat exchanger outlet-temperature sensor 76, and an outdoor air temperature sensor 75. The high-pressure detection sensor 73 detects a high pressure that is the pressure of the refrigerant on the discharge side of the compressor 11. The discharge temperature sensor 71 detects the temperature of high-temperature and high-pressure refrigerant discharged from the compressor 11. The suction temperature sensor 72 detects the temperature of low-temperature and low-pressure refrigerant to be sucked into the compressor 11. The low-pressure detection sensor 74 detects a low pressure that is the pressure of the refrigerant on the suction side of the compressor 11. The refrigerant-to-refrigerant heat exchanger outlet-temperature sensor 76 detects the temperature of the refrigerant subjected to heat exchange at the refrigerant-to-refrigerant heat exchanger 42. The outdoor air temperature sensor 75 is provided at an air suction portion of the heat-source-side heat exchanger 13 and detects an ambient temperature of the outdoor unit 1 as an outdoor air temperature.

[Relay Unit 2]

The relay unit 2 is part of a heat-use unit and causes heat exchange to be performed between the refrigerant and the heat medium. The relay unit 2 includes the intermediate heat exchanger 21a, a pump 22a, a heat-medium supply pipe 61a, and a heat-medium return pipe 62a. For example, in a building, the relay unit 2 is installed in a non-air-conditioned space, which is a space different from air-conditioned spaces in which the indoor units 3 are installed.

The intermediate heat exchanger 21a includes a heat transfer unit that allows the refrigerant to pass therethrough and a heat transfer unit that allows the heat medium to pass therethrough, and causes heat exchange to be performed between the refrigerant and the heat medium. In Embodiment 1, the intermediate heat exchanger 21a operates as a condenser in the heating operation and causes the refrigerant to transfer heat to the heat medium to heat the heat medium. By contrast, the intermediate heat exchanger 21a operates as an evaporator in the cooling operation and causes the refrigerant to receive heat from the heat medium to cool the heat medium.

The pump 22a, which is a first pump, is a heat-medium sending device that pressurizes the heat medium to cause the heat medium to circulate in the heat-medium cycle circuit. The pump 22a can change a discharge flow rate, which is the flow rate of the heat medium to be sent out, by changing the rotation speed of a motor (not illustrated) provided in the pump 22a, within a certain range. The pump 22a is provided at the heat-medium return pipe 62a that connects the intermediate heat exchanger 21a and a heat-medium flow adjustment device 32a. The heat medium sent out by the pump 22a flows into the intermediate heat exchanger 21a.

An opening and closing device 52 is, for example, a two-way valve, and is configured to open and close the return pipe 4c. The opening and closing device 52 is provided at the return pipe 4c on an outlet side of the intermediate heat exchanger 21a and is housed in the relay unit 2. A check valve 29 prevents the refrigerant that has passed through the return pipe 4b from entering the return pipe 4c, when the opening and closing device 52 is closed.

Furthermore, the relay unit 2 includes a refrigerant temperature sensor 81, a refrigerant temperature sensor 83, a heat-medium temperature sensor 24a, and a heat-medium temperature sensor 25a. The refrigerant temperature sensor 81 detects the temperature of the refrigerant on an inlet side of the intermediate heat exchanger 21a. The refrigerant temperature sensor 83 detects the temperature of the refrigerant on an outlet side of the intermediate heat exchanger 21a. The heat-medium temperature sensor 24a detects the temperature of the heat medium on an outlet side of the intermediate heat exchanger 21a. The heat-medium temperature sensor 25a detects the temperature of the heat medium on an inlet side of the intermediate heat exchanger 21a.

[Indoor Unis]

An indoor unit 3a and an indoor unit 3b are installed, for example, in rooms that are air-conditioned spaces, and supply air-conditioned air to the rooms. The indoor unit 3a and the indoor unit 3b are included in the heat-use unit. As devices of the heat-medium cycle circuit, the indoor unit 3a and the indoor unit 3b include a use-side heat exchanger 31a and a use-side heat exchanger 31b, respectively, and a heat-medium flow adjustment device 32a and a heat-medium flow adjustment device 32b, respectively.

The use-side heat exchanger 31a and the use-side heat exchanger 31b are connected to components in the relay unit 2 by the heat medium pipes 5. Each of the use-side heat exchanger 31a and the use-side heat exchanger 31b causes heat exchange to be performed between the heat medium and indoor air that is a heat load, thereby generating heated air for the heating operation or cooled air for the cooling operation, which is to be supplied to an associated one of the air-conditioned spaces. To the use-side heat exchanger 31a and the use-side heat exchanger 31b, indoor air is sent from an indoor fan 311a and an indoor fan 311b, respectively.

Each of the heat-medium flow adjustment device 32a and the heat-medium flow adjustment device 32b is, for example, a two-way valve whose opening area can be controlled. The heat-medium flow adjustment device 32a controls the flow rate of the heat medium that flows in the use-side heat exchanger 31a, and the heat-medium flow adjustment device 32b controls the flow rate of the heat medium that flows in the use-side heat exchanger 31b. Ends of the heat-medium flow adjustment device 32a and the heat-medium flow adjustment device 32b are connected to the use-side heat exchanger 31a and the use-side heat exchanger 31b, respectively, and the other ends of the heat-medium flow adjustment device 32a and the heat-medium flow adjustment device 32b are connected to respective heat medium pipes 5. The heat-medium flow adjustment device 32a is provided at the heat-medium flow passage on an outlet side of the use-side heat exchanger 31a and the heat-medium flow adjustment device 32b is provided at the heat-medium flow passage on an outlet side of the use-side heat exchanger 31b. In this case, the heat-medium flow adjustment device 32a and the heat-medium flow adjustment device 32b may be provided at the heat-medium flow passage on an inlet side of the use-side heat exchanger 31a and at the heat-medium flow passage on an inlet side of the use-side heat exchanger 31b, respectively.

Furthermore, the indoor unit 3a includes an inlet-side temperature sensor 34a and an outlet-side temperature sensor 35a, and the indoor unit 3b includes an inlet-side temperature sensor 34b and an outlet-side temperature sensor 35b. The inlet-side temperature sensor 34a and the inlet-side temperature sensor 34b are, for example, thermistors. The inlet-side temperature sensor 34a detects the temperature of the heat medium that flows into the use-side heat exchanger 31a, and the inlet-side temperature sensor 34b detects the temperature of the heat medium that flows into the use-side heat exchanger 31b. The inlet-side temperature sensor 34a is provided at a pipe on a heat-medium inlet side of the use-side heat exchanger 31a and the inlet-side temperature sensor 34b is provided at a pipe on a heat-medium inlet side of the use-side heat exchanger 31b. The outlet-side temperature sensor 35a and the outlet-side temperature sensor 35b are, for example, thermistors. The outlet-side temperature sensor 35a detects the temperature of the heat medium that flows out of the use-side heat exchanger 31a, and the outlet-side temperature sensor 35b detects the temperature of the heat medium that flows out of the use-side heat exchanger 31b. The outlet-side temperature sensor 35a is provided at a pipe on a heat-medium outlet side of the use-side heat exchanger 31a, and the outlet-side temperature sensor 35b is provided at a pipe on a heat-medium outlet side of the use-side heat exchanger 31b.

A controller 50 controls the entire air-conditioning apparatus 100. The controller 50 includes, for example, an analog circuit, a digital circuit, a central processing unit (CPU), or a combination of at least two of the analog circuit, the digital circuit, and the CPU. The controller 50 controls various devices and apparatuses based on, for example, data on data on physical quantities detected by the above sensors and instructions from an input device, such as a remote control unit, to execute each of operation modes, which will be described later. For example, the controller 50 controls the driving frequency of the compressor 11 in the outdoor unit 1, the rotation speed (including ON or OFF) of the outdoor fan 131, switching operations of the first flow switching device 12 and the second flow switching device 14, the opening degrees of the first expansion device 15 and the second expansion device 41, etc. The controller 50 also controls the driving frequency of the pump 22a in the relay unit 2. In addition, the controller 50 controls the opening degree of the heat-medium flow adjustment device 32a in the indoor unit 3a and that of the heat-medium flow adjustment device 32b in the indoor unit 3b. It should be noted that although FIG. 1 illustrates the case where the controller 50 is provided in the outdoor unit 1, this illustration is not limiting. In the outdoor unit 1, the relay unit 2, the indoor unit 3a, and the indoor unit 3b, respective controllers 50 may be provided. In addition, the controller 50 may be provided in at least one of the indoor unit 3a and the indoor unit 3b.

[Operation Modes of Air-Conditioning Apparatus 100]

Next, operation modes of the air-conditioning apparatus 100 will be described. The air-conditioning apparatus 100 can perform the cooling operation or the heating operation in response to an instruction from each of the indoor unit 3a and the indoor unit 3b. In the following, the operation of the air-conditioning apparatus 100 in each of operation modes will be explained together with the flow and state of refrigerant.

[Cooling Operation Mode]

Figure 2:
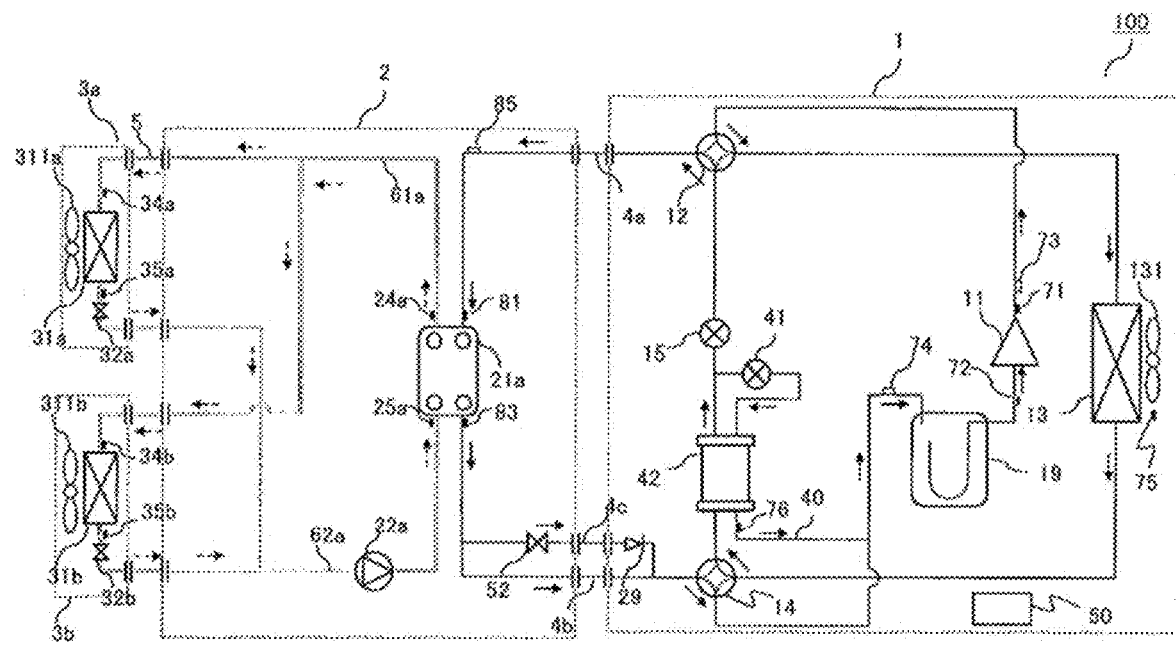
FIG. 2 is an explanatory diagram for an example of the flow of refrigerant, etc., in a cooling operation of the air-conditioning apparatus according to Embodiment 1 of the present disclosure.

FIG. 2 is an explanatory diagram for an example of the flow of refrigerant in the cooling operation of the air-conditioning apparatus according to Embodiment 1 of the present disclosure. With respect to the example illustrated in FIG. 2, a cooling operation mode in which the indoor unit 3a and the indoor unit 3b perform cooling will be described. It should be noted that in FIG. 2, solid arrows indicate flow directions of the refrigerant and dashed arrows indicate flow directions of the heat medium in order that the flows be more easily understood.

First of all, operations of components in a refrigerant cycle circuit will be described referring to the flow of the refrigerant. The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant discharged from the compressor 11 flows into the heat-source-side heat exchanger 13 via the first flow switching device 12. The heat-source-side heat exchanger 13 causes heat exchange to be performed between outdoor air supplied by the outdoor fan 131 and the high-temperature and high-pressure gas refrigerant. The high-temperature and high-pressure gas refrigerant is cooled by the heat exchange to change into middle-temperature and high-pressure liquid refrigerant. The middle-temperature and high-pressure liquid refrigerant obtained through cooling by the heat exchange at the heatsource-side heat exchanger 13 flows into the refrigerant-to-refrigerant heat exchanger 42 via the second flow switching device 14. The refrigerant-to-refrigerant heat exchanger 42 causes heat exchange to be performed between low-temperature and low-pressure two-phase gas-liquid refrigerant that flows in the bypass circuit 40 and the middle-temperature and high-pressure liquid refrigerant that flows between the second flow switching device 14 and the first expansion device 15. The middle-temperature and high-pressure liquid refrigerant is cooled by the heat exchange to change into low-temperature and high-pressure liquid refrigerant. The low-temperature and high-pressure liquid refrigerant obtained through cooling by the heat exchange at the refrigerant-to-refrigerant heat exchanger 42 flows into the first expansion device 15. The first expansion device 15 reduces the pressure of the low-temperature and high-pressure liquid refrigerant, thereby changing the low-temperature and high-pressure liquid refrigerant into low-temperature and low-pressure two-phase gas-liquid refrigerant. The low-temperature and low-pressure two-phase gas-liquid refrigerant obtained through pressure-reduction by the first expansion device 15 flows into the intermediate heat exchanger 21a via the first flow switching device 12 and the supply pipe 4a. The intermediate heat exchanger 21a causes heat exchange to be performed between the low-temperature and low-pressure two-phase gas-liquid refrigerant and the heat medium that is circulated in the heat-medium cycle circuit by the pump 22a, thereby changing the low-temperature and low-pressure two-phase gas-liquid refrigerant into low low-temperature and low-pressure gas refrigerant. The low-temperature and low-pressure gas refrigerant obtained through heating by the heat exchange at the intermediate heat exchanger 21a passes through the return pipes 4b and 4c and is re-sucked into the compressor 11 via the second flow switching device 14 and the accumulator 19. At this time, the opening and closing device 52 is opened.

Next, operations of components in a heat-medium cycle circuit will be described referring to the flow of the heat medium. The pump 22a sucks and pressurizes the heat medium. The heat medium sent by the pump 22a flows into the intermediate heat exchanger 21a. The intermediate heat exchanger 21a causes cooling energy of the refrigerant in the refrigerant cycle circuit to be transferred to the heat medium, and the heat medium cooled thereby passes through the heat-medium supply pipe 61a. The heat medium that has passed through the heat-medium supply pipe 61a flows into the use-side heat exchanger 31a and the use-side heat exchanger 31b via the heat medium pipes 5 associated therewith. At this time, the indoor unit 3a and the indoor unit 3b perform cooling, and the use-side heat exchanger 31a and the use-side heat exchanger 31b cause heat exchange to be performed between the heat mediums having a low-temperature and indoor air supplied by an indoor fan 311a and an indoor fan 311b. As a result, the indoor air is cooled, and the heat mediums having a low-temperature are changed into middle-temperature heat mediums. The middle-temperature heat mediums obtained though heating by the heat exchange at the use-side heat exchanger 31a and the use-side heat exchanger 31b are re-sucked into the pump 22a via the heat-medium flow adjustment device 32a, the heat-medium flow adjustment device 32b, the respective heat medium pipes 5 and the heat-medium return pipe 62a.

[Temperature Distribution in Heat Exchanger in Cooling Operation Mode]

Figure 3:
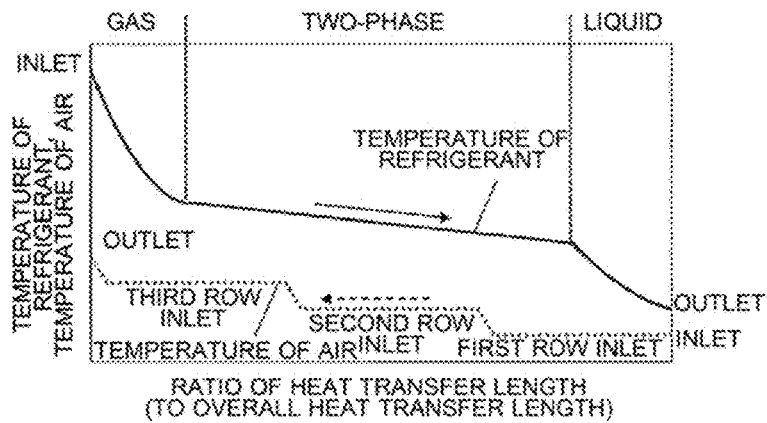
FIG. 3 is an explanatory diagram for an example of the temperature distribution in a heat-source-side heat exchanger 13 in the cooling operation of the air-conditioning apparatus according to Embodiment 1 of the present disclosure.

FIG. 3 is an explanatory diagram for an example of temperature distributions in the heat-source-side heat exchanger 13 in a cooling operation of the air-conditioning apparatus according to Embodiment 1 of the present disclosure. The example illustrated in FIG. 3 will be described with respect to the case where three heat exchangers included in the heat-source-side heat exchanger 13 are arranged in three rows (The same applies in the following). In FIG. 3, the horizontal axis represents the ratio of a heat transfer length to the overall heat transfer length. The vertical axis represents the temperature of the refrigerant and the temperature of air. In this case, the overall heat transfer length means the length of a heat transfer tube that is a flow passage in which the refrigerant flows from the inlet of the heat exchanger to the outlet of the heat exchanger (the same applies in the following). High-temperature and high-pressure gas refrigerant that has flowed into the heat-source-side heat exchanger 13 causes heat to be transferred to air having a lower temperature, as a result of which the temperature of the high-temperature and high-pressure gas refrigerant is reduced; and the high-temperature and high-pressure gas refrigerant then changes into two-phase gas-liquid refrigerant when the temperature of the high-temperature and high-pressure gas refrigerant reaches a saturation temperature. When the two-phase gas-liquid refrigerant is obtained in the above manner, the temperature of the two-phase gas-liquid refrigerant is reduced as condensation thereof progresses because of characteristics of the zeotropic refrigerant mixture, to change into liquid refrigerant. Then, when the liquid refrigerant transfers heat to air having a low temperature, the temperature of the refrigerant is further reduced.

Figure 4:
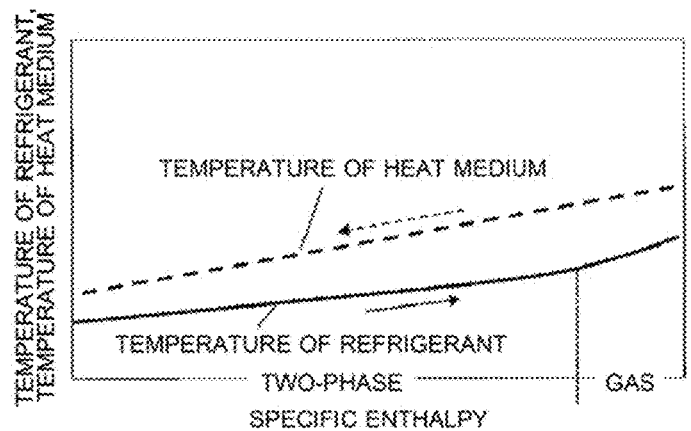
FIG. 4 is an explanatory diagram for an example of the temperature distribution in an intermediate heat exchanger 21*a* in the cooling operation of the air-conditioning apparatus according to Embodiment 1 of the present disclosure.

FIG. 4 is an explanatory diagram for an example of the temperature distribution in an intermediate heat exchanger 21a in the cooling operation of the air-conditioning apparatus according to Embodiment 1 of the present disclosure. In FIG. 4, the horizontal axis represents specific enthalpy, and the vertical axis represents the temperature of the refrigerant and the temperature of the heat medium. When low-temperature and low-pressure two-phase gas-liquid refrigerant flows into the intermediate heat exchanger 21a, the temperature of the refrigerant rises as heat exchange progresses because of characteristics of the zeotropic refrigerant mixture, as a result of which the refrigerant changes into gas refrigerant. The temperature of the gas refrigerant rises as heat exchange progresses. By contrast, the temperature of the heat medium that flows in the intermediate heat exchanger 21a is reduced as heat exchange progresses.

Figure 5:
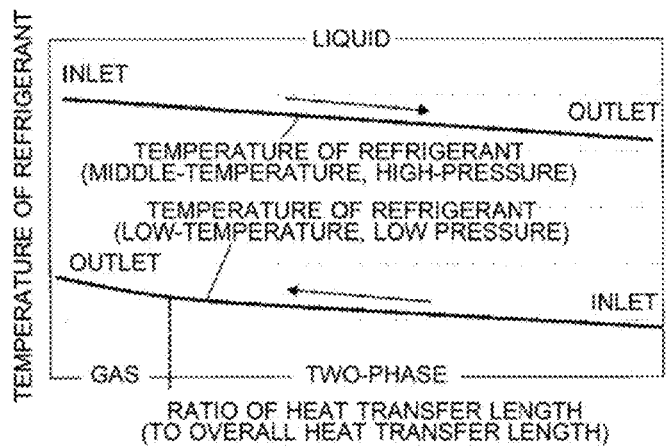
FIG. 5 is an explanatory diagram for an example of the temperature distribution in a refrigerant-to-refrigerant heat exchanger 42 in the cooling operation of the air-conditioning apparatus according to Embodiment 1 of the present disclosure.

FIG. 5 is an explanatory diagram for an example of a temperature distribution in the refrigerant-to-refrigerant heat exchanger 42 in the cooling operation of the air-conditioning apparatus according to Embodiment 1 of the present disclosure. When middle-temperature and high-pressure liquid refrigerant flows into the refrigerant-to-refrigerant heat exchanger 42, the temperature of the refrigerant is reduced as heat exchange progresses. When low-temperature and low-pressure two-phase gas-liquid refrigerant flows into the refrigerant-to-refrigerant heat exchanger 42, the temperature of the refrigerant rises as heat exchange progresses because of characteristics of the zeotropic refrigerant mixture, as a result of which the refrigerant changes into gas refrigerant.

[Advantages of Cooling Operation Mode]

As described above, in the air-conditioning apparatus 100 of Embodiment 1, in the cooling operation mode, the refrigerant that flows in the heat-source-side heat exchanger 13 necessarily flows in the opposite direction to the flow direction of air, that is, counterflow is necessarily achieved. It is therefore possible to reduce the temperature difference between the refrigerant and the air in the heat exchanger, and improve the heat exchange efficiency. Furthermore, the refrigerant that flows in the intermediate heat exchanger 21a necessarily flows in the opposite direction of the flow direction of the heat medium, that is, counterflow is necessarily achieved. It is therefore possible to reduce the temperature difference between the refrigerant and the heat medium, which is a heat use medium, and improve the heat exchange efficiency. Moreover, in the bypass circuit 40 and the refrigerant-to-refrigerant heat exchanger 42, by reducing the flow rate of the refrigerant in the main flow without causing a heat loss, the pressure loss in a low-pressure portion can be reduced. In addition, by providing the return pipes 4b and 4c parallel to each other and opening the opening and closing device 52 provided at the return pipe 4c, the refrigerant is caused to flow through both the return pipe 4b and the return pipe 4c. Therefore, the cross-sectional area of the pipes through which low-temperature, low-pressure two-phase gas-liquid refrigerant or gas refrigerant passes is increased, and the pressure loss is reduced. It is therefore possible to reduce the deterioration of the performance.

[Heating Operation Mode]

Figure 6:
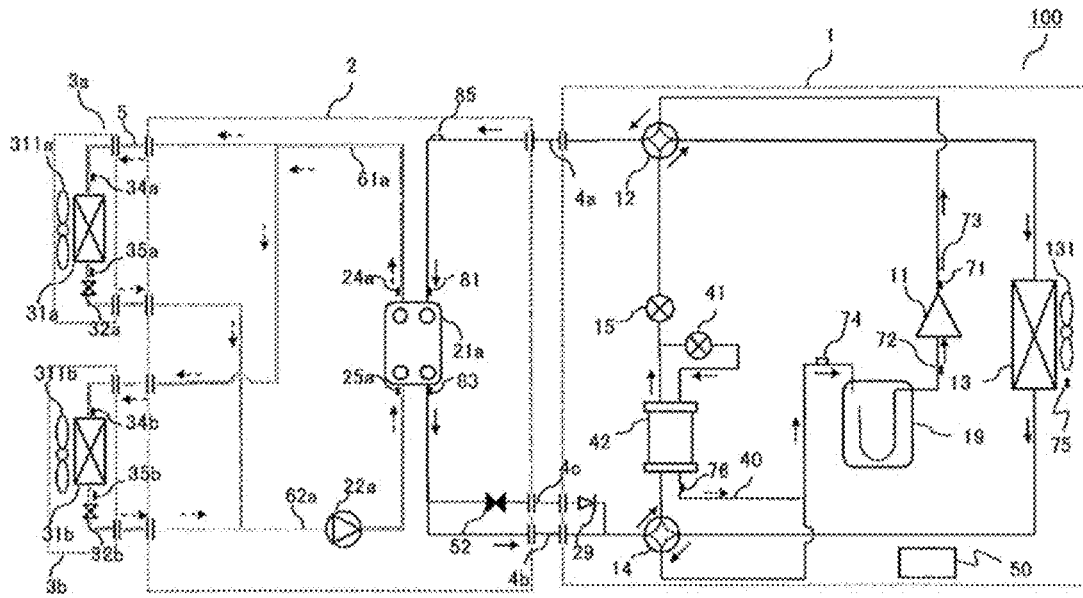
FIG. 6 is an explanatory diagram for an example of the flow of refrigerant, etc. and other fluid in a heating operation of the air-conditioning apparatus according to Embodiment 1 of the present disclosure.

FIG. 6 is an explanatory diagram for an example of the flow of refrigerant, etc., in the heating operation of the air-conditioning apparatus according to Embodiment 1 of the present disclosure. The example illustrated in FIG. 6 will be described with respect to a heating operation mode in which the indoor unit 3a and the indoor unit 3b perform heating. It should be noted that in FIG. 6, solid arrows indicate flow directions of the refrigerant and dashed arrows indicate flow directions of the heat medium in order that Embodiment 1 be more easily understood.

First of all, operations of components in a refrigerant cycle circuit will be described referring to the flow of the refrigerant. The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant discharged from the compressor 11 flows into the intermediate heat exchanger 21a via the first flow switching device 12 and the supply pipe 4a. The intermediate heat exchanger 21a causes heat exchange to be performed between the high-temperature and high-pressure gas refrigerant and the heat medium that is circulated in the heat-medium cycle circuit by the pump 22a. The high-temperature and high-pressure gas refrigerant is cooled by the heat exchange to change into middle-temperature and high-pressure liquid refrigerant. The middle-temperature and high-pressure liquid refrigerant obtained though cooling by the heat exchange at the intermediate heat exchanger 21a passes through the return pipe 4b. In this case, the opening and closing device 52 is closed, and the refrigerant is thus allowed to pass through the return pipe 4c. The middle-temperature and high-pressure liquid refrigerant further flows into the first expansion device 15 via the second flow switching device 14 and the refrigerant-to-refrigerant heat exchanger 42. The first expansion device 15 reduces the pressure of the middle-temperature and high-pressure liquid refrigerant to change the middle-temperature and high-pressure liquid refrigerant into low-temperature and low-pressure two-phase gas-liquid refrigerant. The low-temperature and low-pressure two-phase gas-liquid refrigerant obtained through pressure-reduction by the first expansion device 15 flows into the heat-source-side heat exchanger 13 via the first flow switching device 12. The heat-source-side heat exchanger 13 causes heat exchange to be performed between outdoor air supplied by the outdoor fan 131 and the low-temperature and low-pressure two-phase gas-liquid refrigerant, whereby the low-temperature and low-pressure two-phase gas-liquid refrigerant is heated to change into low-temperature and low-pressure gas refrigerant. The low-temperature and low-pressure gas refrigerant obtained through heating by heat exchange at the heat-source-side heat exchanger 13 is re-sucked into the compressor 11 via the second flow switching device 14 and the accumulator 19.

Next, operations of components in a heat-medium cycle circuit will be described referring to the flow of the heat medium. The pump 22a sucks and pressurizes the heat medium. The heat medium sent by the pump 22a flows into the intermediate heat exchanger 21a. The intermediate heat exchanger 21a causes heating energy of the refrigerant in the refrigerant cycle circuit to be transferred to the heat medium, and the heat medium heated passes through the heat-medium supply pipe 61a. The high-temperature heat medium flows into the use-side heat exchanger 31a and the use-side heat exchanger 31b via the heat medium pipes 5 associated therewith. At this time, the indoor unit 3a and the indoor unit 3b perform heating, and the use-side heat exchanger 31a and the use-side heat exchanger 31b causes heat exchange to be performed between the high-temperature heat medium and indoor air supplied by the indoor fan 311a and the indoor fan 311b. Thus, the indoor air is heated, and the high-temperature heat medium is changed into middle-temperature heat medium. The middle-temperature heat medium obtained through cooling by the heat exchange at the use-side heat exchanger 31a and the use-side heat exchanger 31b is re-sucked into the pump 22a via the heat-medium flow adjustment device 32a, the heat-medium flow adjustment device 32b, the heat medium pipe 5 and the heat-medium return pipe 62a.

[Temperature Distributions in Heat Exchanger in Heating Operation Mode]

Figure 7:
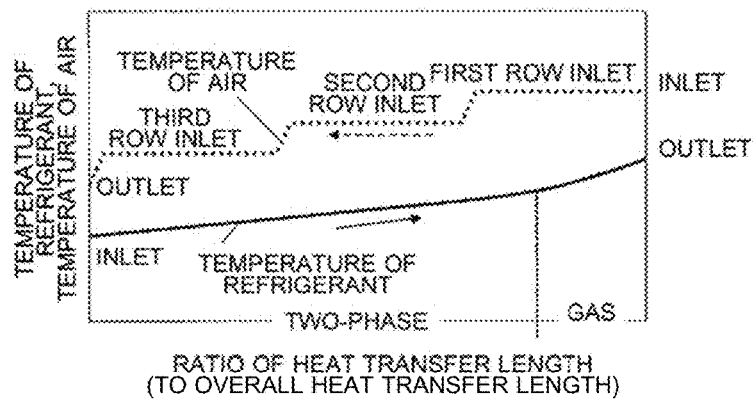
FIG. 7 is an explanatory diagram for an example of the temperature distribution in the heat-source-side heat exchanger 13 in the heating operation of the air-conditioning apparatus according to Embodiment 1 of the present disclosure.

FIG. 7 is an explanatory diagram for an example of a temperature distribution in the heat-source-side heat exchanger 13 in the heating operation of the air-conditioning apparatus according to Embodiment 1 of the present disclosure. The example illustrated in FIG. 7 will be described with respect to the case where three heat exchangers included in the heat-source-side heat exchanger 13 are arranged in three rows. In FIG. 7, the horizontal axis represents the ratio of a heat transfer length to the overall heat transfer length, and the vertical axis represents the temperature of the refrigerant and the temperature of air. Low-temperature and low-pressure two-phase gas-liquid refrigerant that has flowed into the heat-source-side heat exchanger 13 receives heat from air having a higher temperature. The temperature of the low-temperature and low-pressure two-phase gas-liquid refrigerant rises as heat exchange progresses because of characteristics of the zeotropic refrigerant mixture, whereby the low-temperature and low-pressure two-phase gas-liquid refrigerant changes into gas refrigerant. Then, when the gas refrigerant receives heat from air having a high temperature, the temperature of the gas refrigerant rises.

Figure 8:
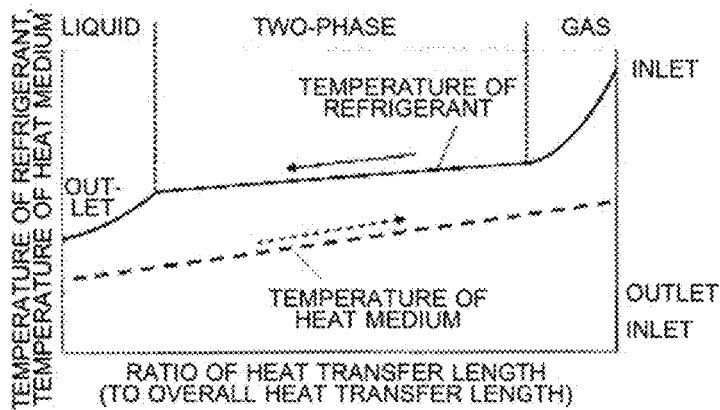
FIG. 8 is an explanatory diagram for an example of the temperature distribution in the intermediate heat exchanger 21a in a heating operation of the air-conditioning apparatus according to Embodiment 1 of the present disclosure.

FIG. 8 is an explanatory diagram for an example of a temperature distribution in the intermediate heat exchanger 21a in the heating operation of the air-conditioning apparatus according to Embodiment 1 of the present disclosure. In FIG. 8, the horizontal axis represents specific enthalpy, and the vertical axis represents the temperature of the refrigerant and the temperature of the heat medium. High-temperature and high-pressure gas refrigerant that has flowed into the intermediate heat exchanger 21a transfers heat to to the heat medium having a lower temperature, whereby the temperature of the high-temperature and high-pressure gas refrigerant is reduced, and the high-temperature and high-pressure gas refrigerant changes into two-phase gas-liquid refrigerant when the temperature thereof reaches a saturation temperature. The temperature of the two-phase gas-liquid refrigerant lowers as the condensation progresses because of characteristics of the zeotropic refrigerant mixture, and the two-phase gas-liquid refrigerant changes into liquid refrigerant. Then, when the liquid refrigerant transfers heat to the heat medium having a low temperature, the temperature of the refrigerant is further reduced. By contrast, the temperature of the heat medium that flows into the intermediate heat exchanger 21a rises as heat exchange progresses.

Figure 9:
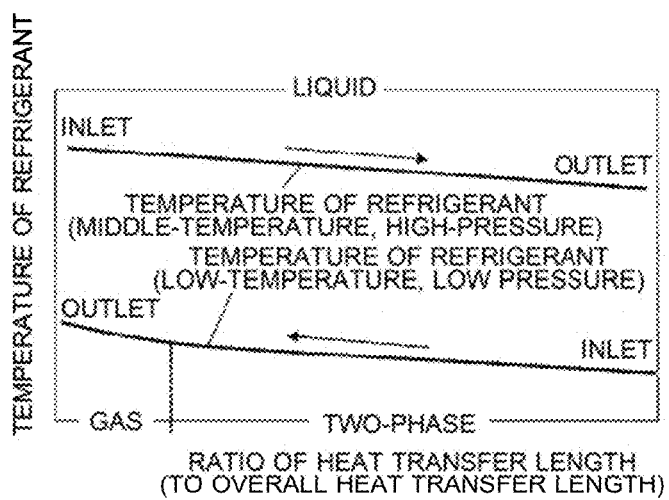
FIG. 9 is an explanatory diagram for an example of the temperature distribution in the refrigerant-to-refrigerant heat exchanger 42 in the heating operation of the air-conditioning apparatus according to Embodiment 1 of the present disclosure.

FIG. 9 is an explanatory diagram for an example of a temperature distribution in the refrigerant-to-refrigerant heat exchanger 42 in the heating operation of the air-conditioning apparatus according to Embodiment 1 of the present disclosure. The temperature of middle-temperature and high-pressure liquid refrigerant that has flowed into the refrigerant-to-refrigerant heat exchanger 42 lowers as heat exchange progresses. The temperature of low-temperature and low-pressure two-phase gas-liquid refrigerant that has flowed into the refrigerant-to-refrigerant heat exchanger 42 rises as heat exchange progresses because of characteristics of the zeotropic refrigerant mixture, whereby the low-temperature and low-pressure two-phase gas-liquid refrigerant changes into gas refrigerant.

[Advantages of Heating Operation Mode]

As described above, in the air-conditioning apparatus 100 of Embodiment 1, in the heating operation mode, the refrigerant that flows in the heat-source-side heat exchanger 13 necessarily flows in the opposite direction to the flow direction of air, that is, counterflow is necessarily achieved. It is therefore possible to reduce the temperature difference between the refrigerant and the air in the heat exchanger, and improve the heat exchange efficiency. Furthermore, the refrigerant that flows in the intermediate heat exchanger 21a necessarily flows in the opposite direction to the flow direction of the heat medium, that is, counterflow is necessarily achieved. It is therefore possible to reduce the temperature difference between the refrigerant and the heat medium, which is a heat use medium, and improve the heat exchange efficiency. Moreover, by closing the opening and closing device 52 provided at the return pipe 4c to allow high-pressure liquid refrigerant to flow through the return pipe 4b only, it is possible to reduce the flow rate of the refrigerant that circulates in the refrigerant cycle circuit in the air-conditioning apparatus 100 in the heating operation mode.

In addition, in the air-conditioning apparatus 100 of Embodiment 1, a zeotropic refrigerant mixture is used as the refrigerant that circulates in the refrigerant cycle circuit. For example, in the heat exchanger, in a parallel flow in which the flow direction of the refrigerant is the same as the flow direction of the heat medium, the temperature difference is reduced because of a temperature gradient as heat exchange using latent heat progresses, and thus the heat exchange performance is reduced. By contrast, in the heat exchanger, by providing a flow passage for the refrigerant and a flow passage for the heat medium such that flow directions of the refrigerant and the heat medium are opposite to each other, that is, counterflow is achieved, the temperature difference is hard to reduce even when the heat exchange progresses. Thus, the heat exchange performance can be improved. In the refrigerant cycle circuit in which heat exchange and other operations are performed using two-phase gas-liquid refrigerant, the use of a flow passage configuration that causes flow directions of the refrigerant and the heat medium to be opposite to each other in a heat exchanger, that is, causes counterflow to be achieved in the heat exchanger, is advantageous, especially in the case of using a zeotropic refrigerant mixture that has a large temperature gradient under a pressure condition of refrigerant to be used. In this case, the refrigerant having a large temperature gradient is a zeotoropic refrigerant mixture that has a temperature gradient of 2 degrees C. or higher, for example. In the air-conditioning apparatus 100 of Embodiment 1, in both the cooling operation and the heating operation, the refrigerant flow and the heat medium flow are counterflow in the intermediate heat exchanger 21a and in the heat-source-side heat exchanger 13, and a high heat exchange efficiency can thus be achieved.

Embodiment 2

[Air-Conditioning Apparatus 100]

Figure 10:
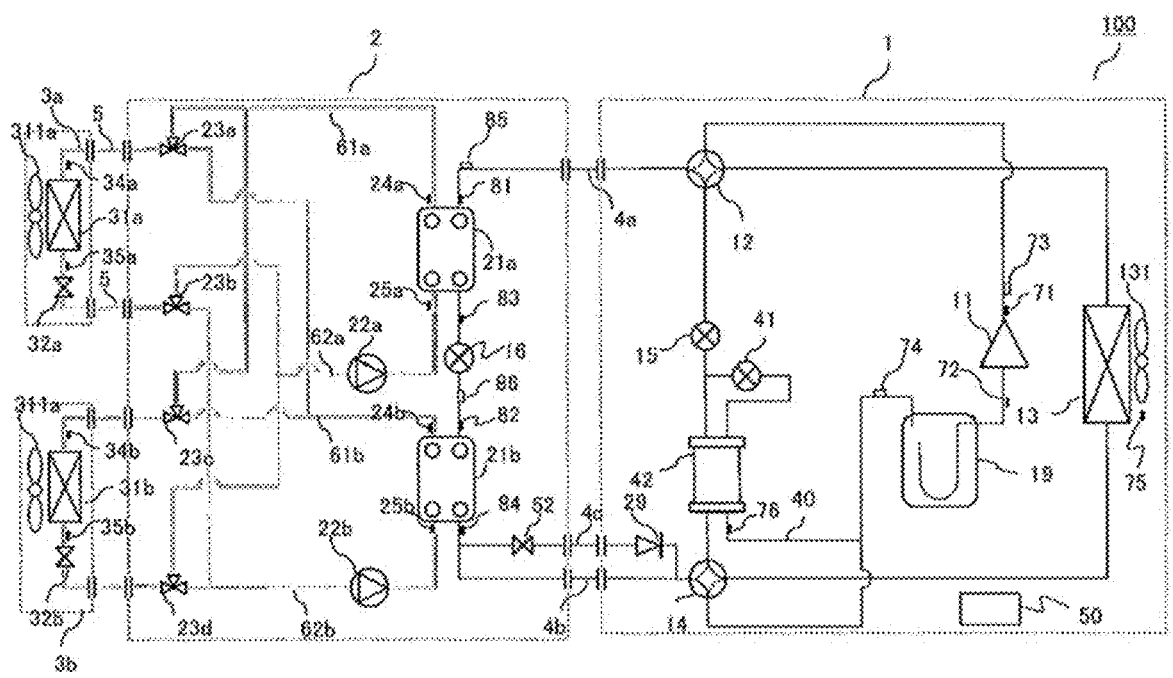
FIG. 10 is a schematic diagram illustrating an example of the configuration of circuits and other components in an air-conditioning apparatus according to Embodiment 2 of the present disclosure.

FIG. 10 is a schematic diagram illustrating an example of the configuration of circuits and other components in an air-conditioning apparatus according to Embodiment 2 of the present disclosure. For each of the indoor units 3 in the air-conditioning apparatus 100 of Embodiment 2, it is possible to select a cooling operation mode or a heating operation mode. Embodiment 2 will be described mainly by referring to the differences between the air-conditioning apparatuses 100 according to Embodiments 1 and 2. Regarding Embodiment 2, components that perform similar operations to those of Embodiment 1 will be denoted by the same reference signs.

In the air-conditioning apparatus 100 of Embodiment 2, the relay unit 2 includes the intermediate heat exchanger 21a, an intermediate heat exchanger 21b, a third expansion device 16, the pump 22a, and a pump 22b. The relay unit 2 also includes a heat-medium flow switching device 23a, a heat-medium flow switching device 23b, a heat-medium flow switching device 23c, a heat-medium flow switching device 23d, the heat-medium supply pipe 61a, a heat-medium supply pipe 61b, the heat-medium return pipe 62a, and a heat-medium return pipe 62b.

In Embodiment 2, the intermediate heat exchanger 21a, which is a first intermediate heat exchanger, operates as a condenser in a heating operation, a cooling main operation, and a heating main operation, and causes refrigerant to transfer heat to heat a heat medium. The intermediate heat exchanger 21a operates as an evaporator in the cooling operation, and causes the refrigerant to receive heat to cool the heat medium. The intermediate heat exchanger 21b, which is a second intermediate heat exchanger, operates as a condenser in the heating operation, and causes the refrigerant to transfer heat to heat the heat medium. The intermediate heat exchanger 21b operates as an evaporator in the cooling operation, the cooling main operation, and the heating main operation, and causes the refrigerant to receive heat to cool the heat medium.

The third expansion device 16 is a refrigerant flow-rate adjustment device that operates as a pressure reducing valve or an expansion valve that reduces the pressure of the refrigerant to expand the refrigerant, and adjusts the flow rate of the refrigerant that passes through the third expansion device 16. The third expansion device 16 may be, for example, an electronic expansion valve or a similar device whose opening degree can be controlled. The third expansion device 16 is provided at a pipe that connects the intermediate heat exchanger 21a and the intermediate heat exchanger 21b.

The pump 22a, which is a first pump, is provided at the heat-medium return pipe 62a that connects the intermediate heat exchanger 21a, the heat-medium flow switching device 23b, and the heat-medium flow switching device 23d. The pump 22b, which is a second pump, is provided at the heat-medium return pipe 62b that connects the intermediate heat exchanger 21b, the heat-medium flow switching device 23b, and the heat-medium flow switching device 23d.

The heat-medium flow switching device 23a, the heat-medium flow switching device 23b, the heat-medium flow switching device 23c, and the heat-medium flow switching device 23d are, for example, three-way switching valves, and are each configured to switch a circulation passage for the heat medium in the heat-medium cycle circuit. The heat-medium flow switching device 23a, the heat-medium flow switching device 23b, the heat-medium flow switching device 23c, and the heat-medium flow switching device 23d each switch the flow passage such that heated heat medium or cooled heat medium flows through the use-side heat exchanger 31a and the use-side heat exchanger 31b. One of ends of each of the heat-medium flow switching device 23a and the heat-medium flow switching device 23c is connected to an associated one of the heat medium pipes 5, one of remaining ones of the ends of each of the heat-medium flow switching device 23a and the heat-medium flow switching device 23c is connected to the heat-medium supply pipe 61a, and the other of the above remaining ends is connected the heat-medium supply pipe 61b. The heat-medium flow switching device 23a and the heat-medium flow switching device 23c switch a flow passage on a heat medium inflow side of the use-side heat exchanger 31a and a flow passage on a heat-medium inlet side of the use-side heat exchanger 31b, respectively. One of the ends of each of the heat-medium flow switching device 23b and the heat-medium flow switching device 23d is connected to an associated one of the heat medium pipes 5, one of remaining ones of the ends of each of the heat-medium flow switching device 23b and the heat-medium flow switching device 23d is connected to the heat-medium return pipe 62a, and the other of the above remaining ends is connected to the heat-medium return pipe 62b. The heat-medium flow switching device 23b and the heat-medium flow switching device 23d switch a flow passage on a heat medium outflow side of the use-side heat exchanger 31a and a flow passage on a heat medium outflow side of the use-side heat exchanger 31b, respectively.

Furthermore, the relay unit 2 includes the refrigerant temperature sensor 81, a refrigerant temperature sensor 82, the refrigerant temperature sensor 83, a refrigerant temperature sensor 84, the heat-medium temperature sensor 24a, a heat-medium temperature sensor 24b, the heat-medium temperature sensor 25a, and a heat-medium temperature sensor 25b. The refrigerant temperature sensor 81 and the refrigerant temperature sensor 82 detect the temperature of the refrigerant on an inlet side of the intermediate heat exchanger 21a and that on an inlet side of the intermediate heat exchanger 21b, respectively. The refrigerant temperature sensor 83 and the refrigerant temperature sensor 84 detect the temperature of the refrigerant on an outlet side of the intermediate heat exchanger 21a and that on an outlet side of the intermediate heat exchanger 21b, respectively. The heat-medium temperature sensor 24a and the heat-medium temperature sensor 24b detect the temperature of the heat medium on an inlet side of the intermediate heat exchanger 21a and that on inlet side of the intermediate heat exchanger 21b, respectively. The heat-medium temperature sensor 25a and the heat-medium temperature sensor 25b detect the temperature of the heat medium on an outlet side of the intermediate heat exchanger 21a and that on an outlet side of the intermediate heat exchanger 21b, respectively.

[Operation Modes of Air-Conditioning Apparatus 100]

Next, operation modes that the air-conditioning apparatus 100 will be described. The air-conditioning apparatus 100 according to Embodiment 2 can perform any of a cooling only operation, a heating only operation, a cooling main operation, and a heating main operation in response to instructions from the indoor units 3. The cooling only operation is an operation in which all the indoor units 3 that are in operation perform cooling. The heating only operation is an operation in which all the indoor units 3 that are in operation perform heating. The cooling main operation is an operation in which at least one of the indoor units 3 performs cooling and at least one of the indoor units 3 performs heating at the same time and the cooling is performed as a main operation. The heating main operation is an operation in which at least one of the indoor units 3 performs cooling and at least one of the indoor units 3 performs heating at the same time and the heating is performed as a main operation. In the following, the operation of the air-conditioning apparatus 100 in each of the operation modes will be described together with the flow and state of the refrigerant.

[Cooling Operation Mode]

Figure 11:
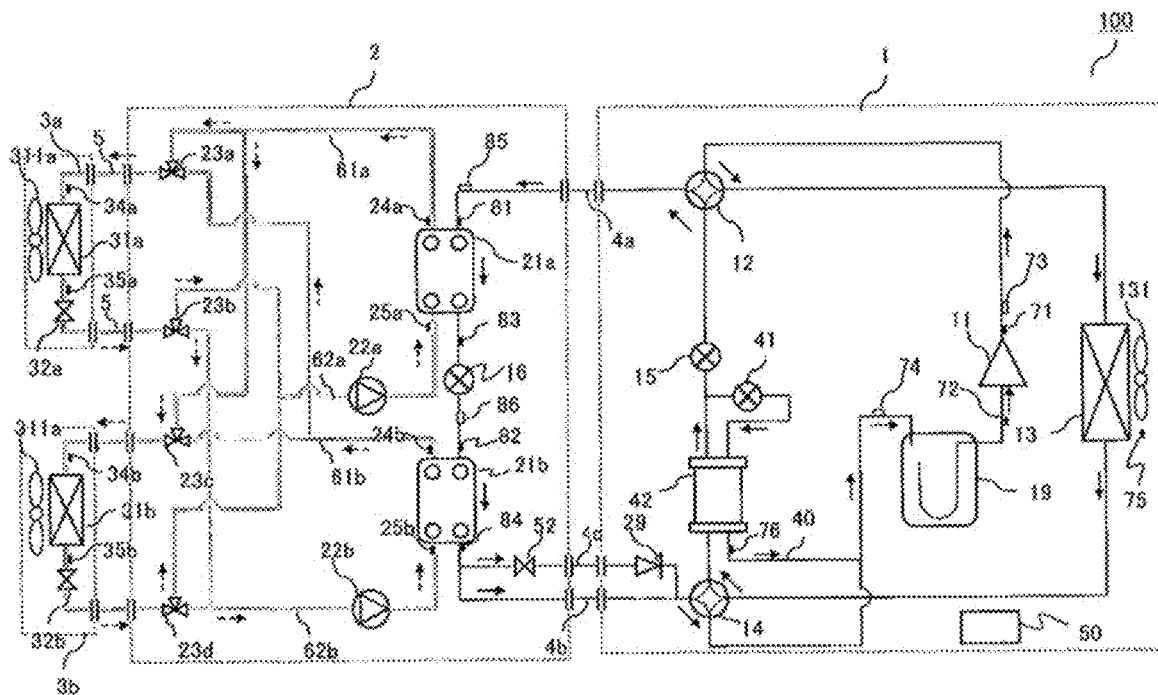
FIG. 11 is an explanatory diagram for an example of the flow of refrigerant, etc., in a cooling only operation of the air-conditioning apparatus according to Embodiment 2 of the present disclosure.

FIG. 11 is an explanatory diagram for an example of the flow of refrigerant, etc., in the cooling only operation of the air-conditioning apparatus according to Embodiment 2 of the present disclosure. The example as illustrated in FIG. 11 will be described with respect to the case where in the cooling only operation mode, the indoor unit 3a and the indoor unit 3b perform cooling. It should be noted that in FIG. 11, solid arrows indicate the flow directions of the refrigerant, and dashed arrows indicate the flow directions of the heat medium in order that the flows be easily understood.

First of all, operations of components provided in the refrigerant cycle circuit will be described based on the flow of the refrigerant. The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant discharged from the compressor 11 flows into the heat-source-side heat exchanger 13 via the first flow switching device 12. The heat-source-side heat exchanger 13 cause heat exchange to be performed between outdoor air supplied by the outdoor fan 131 and the high-temperature and high-pressure gas refrigerant. The high-temperature and high-pressure gas refrigerant is cooled by the heat exchange to change into middle-temperature and high-pressure liquid refrigerant. The middle-temperature and high-pressure liquid refrigerant obtained through cooling by the heat exchange at the heat-source-side heat exchanger 13 flows into the refrigerant-to-refrigerant heat exchanger 42 via the second flow switching device 14. The refrigerant-to-refrigerant heat exchanger 42 causes heat exchanger to be performed between low-temperature and low-pressure two-phase gas-liquid refrigerant that flows in the bypass circuit 40 and middle-temperature and high-pressure liquid refrigerant that flows between the second flow switching device 14 and the first expansion device 15. The middle-temperature and high-pressure liquid refrigerant is cooled by the heat exchange to change into low-temperature and high-pressure liquid refrigerant. The low-temperature and high-pressure liquid refrigerant obtained through cooling by the heat exchange at the refrigerant-to-refrigerant heat exchanger 42 flows into the first expansion device 15. The first expansion device 15 reduces the pressure of the low-temperature and high-pressure liquid refrigerant to change the low-temperature and high-pressure liquid refrigerant into low-temperature and low-pressure two-phase gas-liquid refrigerant. The low-temperature and low-pressure two-phase gas-liquid refrigerant obtained through pressure-reduction by the first expansion device 15 flows into the intermediate heat exchanger 21a via the first flow switching device 12 and the supply pipe 4a. The intermediate heat exchanger 21a causes heat exchange to be performed between the low-temperature and low-pressure two-phase gas-liquid refrigerant and the heat medium that is circulated in the heat-medium cycle circuit by the pump 22a, whereby the low-temperature and low-pressure two-phase gas-liquid refrigerant is heated to change into low-temperature and low-pressure gas refrigerant. The low-temperature and low-pressure gas refrigerant obtained through heating by the heat exchange at the intermediate heat exchanger 21a flows through the return pipes 4b and 4c and is re-sucked into the compressor 11 via the second flow switching device 14 and the accumulator 19. At this time, the opening and closing device 52 is opened.

Next, operations of components provided in the heat-medium cycle circuit will be described based on the flow of the heat medium. The pump 22a sucks and pressurizes the heat medium. The heat medium sent by the pump 22a flows into the intermediate heat exchanger 21a. The intermediate heat exchanger 21a causes cooling energy of the refrigerant in the refrigerant cycle circuit to be transferred to the heat medium, and the heat medium cooled thereby passes through the heat-medium supply pipe 61a. Likewise, the pump 22b sucks and pressurizes the heat medium. The heat medium sent by the pump 22b flows into the intermediate heat exchanger 21b. The intermediate heat exchanger 21b causes cooling energy of the refrigerant in the refrigerant cycle circuit side to be transferred to the heat medium, and the heat medium cooled thereby passes through the heat-medium supply pipe 61b. The heat medium that has passed through the heat-medium supply pipe 61a and the heat medium that has passed through the heat-medium supply pipe 61b join each other at the heat-medium flow switching device 23a and the heat-medium flow switching device 23c, and flow into the use-side heat exchanger 31a and the use-side heat exchanger 31b via the corresponding heat medium pipes 5. At this time, the indoor unit 3a and the indoor unit 3b perform cooling, and the use-side heat exchanger 31a and the use-side heat exchanger 31b cause heat exchange to be performed between the heat medium having a low-temperature and indoor air supplied by the indoor fan 311a and the indoor fan 311b. Thus, the indoor air is cooled, and the heat medium having a low-temperature is changed into middle-temperature heat medium. The middle-temperature heat medium obtained through heating by the heat exchange at the use-side heat exchangers 31a and 31b is re-sucked into the pumps 22a and 22b via the heat-medium flow adjustment devices 32a and 32b, the heat medium pipes 5, the heat-medium flow switching devices 23c and 23b, and the heat-medium return pipes 62a and 62b.

[Temperature Distribution in Heat Exchanger in Cooling Operation Mode]

Figure 12:
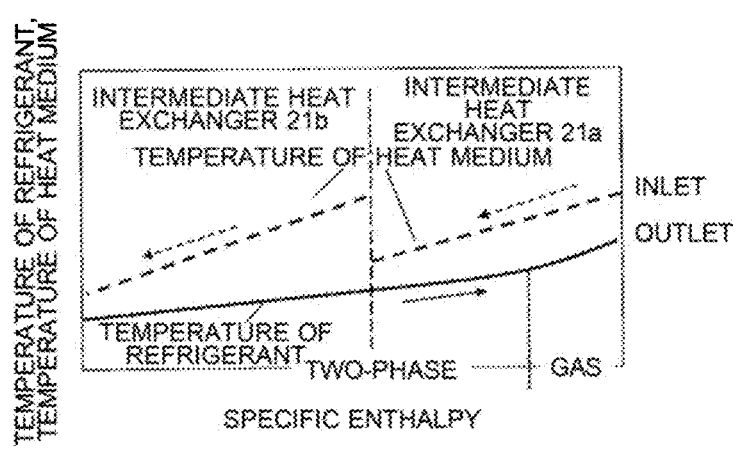
FIG. 12 is an explanatory diagram for an example of the temperature distributions in intermediate heat exchangers 21a and 21b in the cooling operation of the air-conditioning apparatus according to Embodiment 2 of the present disclosure.

FIG. 12 is an explanatory diagram for an example of the temperature distribution in each of the intermediate heat exchangers 21a and 21b in the cooling operation of the air-conditioning apparatus according to Embodiment 2 of the present disclosure. In FIG. 12, the horizontal axis represents specific enthalpy, and the temperature of the refrigerant and the temperature of the heat medium. In this case, it is assumed that the inlet temperatures of the heat mediums are nearly equal to each other. When low-temperature and low-pressure two-phase gas-liquid refrigerant flows into the intermediate heat exchanger 21a, the temperature of the low-temperature and low-pressure two-phase gas-liquid refrigerant rises as the heat exchange progresses because of characteristics of the zeotropic refrigerant mixture. The low-temperature and low-pressure two-phase gas-liquid refrigerant is kept in a two-phase state at the outlet of the intermediate heat exchanger 21a and flows into the intermediate heat exchanger 21b. In the intermediate heat exchanger 21b, the temperature of the two-phase gas-liquid refrigerant rises as the heat exchange progresses because of characteristics of the zeotropic refrigerant mixture, whereby the two-phase gas-liquid refrigerant changes into gas refrigerant. The temperature of the gas refrigerant rises as the heat exchange progresses. By contrast, the temperatures of the heat mediums that flow into the intermediate heat exchanger 21a and the intermediate heat exchanger 21b lower as the heat exchange progresses.

[Advantages of Cooling Only Operation Mode]

As described above, in the air-conditioning apparatus 100 of Embodiment 2, in the cooling operation mode, the refrigerant that flows in the heat-source-side heat exchanger 13 necessarily flows in the opposite to the flow direction of air, that is, counterflow is necessarily achieved. Therefore, the temperature difference between the refrigerant and air in the heat exchanger is reduced, and the heat exchange efficiency can thus be improved. Furthermore, the refrigerant that flows in the intermediate heat exchangers 21a and 21b necessarily flows in the opposite direction to the heat medium, that is, counterflow is necessarily achieved. Therefore, the temperature difference between the refrigerant and the heat medium, which is a heat use medium, in the heat exchanger, is reduced, and the heat exchange efficiency can thus be improved. Moreover, in the bypass circuit 40 and the refrigerant-to-refrigerant heat exchanger 42, by reducing the flow rate of the refrigerant in the main flow without causing a heat loss, it is possible to reduce the pressure loss in a low-pressure portion. In addition, by providing the return pipes 4b and 4c in parallel with each other and by opening the opening and closing device 52 provided at the return pipe 4c, the refrigerant is caused to flow through both the return pipe 4b and the return pipe 4c. Therefore, the cross-sectional area of the pipes through which the low-temperature and low-pressure two-phase gas-liquid refrigerant or gas refrigerant passes is increased, and thus the pressure loss can be reduced. As a result, the performance deterioration can be reduced.

[Heating Only Operation Mode]

Figure 13:
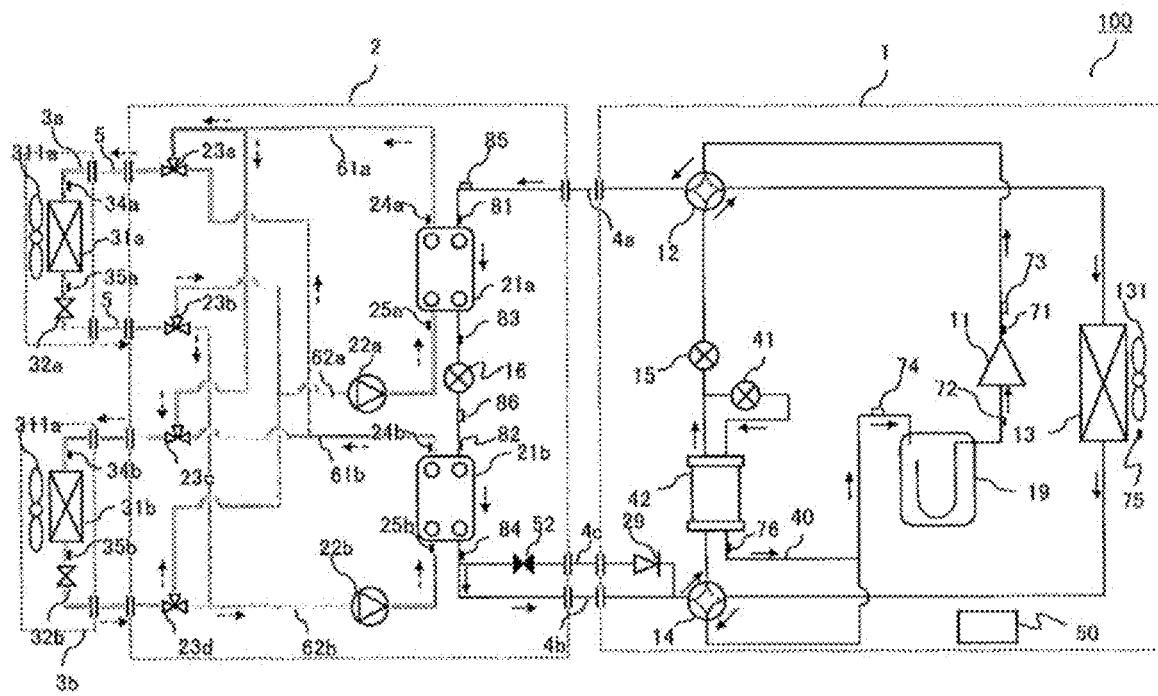
FIG. 13 is an explanatory diagram for an example of the flow of refrigerant, etc., in a heating only operation of the air-conditioning apparatus according to Embodiment 2 of the present disclosure.

FIG. 13 is an explanatory diagram for an example of the flow of refrigerant, etc., in the heating only operation of the air-conditioning apparatus according to Embodiment 2 of the present disclosure. The example illustrated in FIG. 13 will be described with respect to the case where in the heating only operation, the indoor unit 3a and the indoor unit 3b perform heating. In FIG. 13, solid arrows indicate flow directions of the refrigerant and dashed arrows indicate flow directions of the heat medium in order that Embodiment 2 be more easily understood.

First of all, operations of components provided in the refrigerant cycle circuit will be described referring to the flow of the refrigerant. The compressor 11 sucks low-temperature and low-pressure gas refrigerant, compresses the low-temperature and low-pressure gas refrigerant into high-temperature and high-pressure gas refrigerant, and discharges the high-temperature, high-pressure gas refrigerant. The high-temperature and high-pressure gas refrigerant discharged from the compressor 11 flows into the intermediate heat exchanger 21a via the first flow switching device 12 and the supply pipe 4a. The intermediate heat exchanger 21a causes heat exchange to be performed between the high-temperature and high-pressure gas refrigerant and the heat medium that is circulated in the heat-medium cycle circuit by the pump 22a. The high-temperature and high-pressure gas refrigerant is cooled by the heat exchange to change into middle-temperature and high-pressure liquid refrigerant. The middle-temperature and high-pressure liquid refrigerant obtained through cooling by the heat exchange at the intermediate heat exchanger 21a passes through the return pipe 4b. In this case, the opening and closing device 52 is closed and thus the refrigerant does not pass through the return pipe 4c. The middle-temperature and high-pressure liquid refrigerant further flows into the first expansion device 15 via the second flow switching device 14 and the refrigerant-to-refrigerant heat exchanger 42. The first expansion device 15 reduces the pressure of the middle-temperature and high-pressure liquid refrigerant, whereby the middle-temperature and high-pressure liquid refrigerant is changed into low-temperature and low-pressure two-phase gas-liquid refrigerant. The low-temperature and low-pressure two-phase gas-liquid refrigerant obtained through pressure-reduction by the first expansion device 15 flows into the heat-source-side heat exchanger 13 via the first flow switching device 12. The heat-source-side heat exchanger 13 causes heat exchange to be performed between outdoor air supplied by the outdoor fan 131 and the low-temperature and low-pressure two-phase gas-liquid refrigerant, whereby the low-temperature and low-pressure two-phase gas-liquid refrigerant is heated to change into low-temperature and low-pressure gas refrigerant. The low-temperature and low-pressure gas refrigerant obtained through heating at the heat-source-side heat exchanger 13 is re-sucked into the compressor 11 via the second flow switching device 14 and the accumulator 19.

Next, operations of components provided in the heat-medium cycle circuit will be described referring to the flow of the heat medium. The pump 22a sucks and pressurizes the heat medium. The heat medium sent by the pump 22a flows into the intermediate heat exchanger 21a. The intermediate heat exchanger 21a causes heating energy of the refrigerant in the refrigerant cycle circuit to be transferred to the heat medium, and the heat medium heated thereby passes through the heat-medium supply pipe 61a. Likewise, the pump 22b sucks and pressurizes the heat medium. The heat medium sent by the pump 22b flows into the intermediate heat exchanger 21b. The intermediate heat exchanger 21b causes heating energy of the refrigerant in the refrigerant cycle circuit to be transferred to the heat medium, and the heat medium heated thereby passes through the heat-medium supply pipe 61b. The heat medium that has passed through the heat-medium supply pipe 61a and the heat medium that has passed through the heat-medium supply pipe 61b join each other at the heat-medium flow switching device 23a and the heat-medium flow switching device 23c, and flow into the use-side heat exchanger 31a and the use-side heat exchanger 31b via the corresponding heat medium pipes 5. At this time, the indoor unit 3a and the indoor unit 3b perform heating, and the use-side heat exchanger 31a and the use-side heat exchanger 31b cause heat exchange to be performed between the heat medium having a high-temperature and indoor air supplied by the indoor fan 311a and the indoor fan 311b. Thus, the indoor air is heated, and the heat medium having a high-temperature is changed into middle-temperature heat medium. The middle-temperature heat medium obtained through heating at the use-side heat exchangers 31a and 31b is re-sucked into the pumps 22a and 22b via the heat-medium flow adjustment devices 32a and 32b, the heat medium pipes 5, the heat-medium flow switching devices 23c and 23b, and the heat-medium return pipes 62a and 62b.

[Temperature Distribution in Heat Exchanger in Heating Only Operation Mode]

Figure 14:
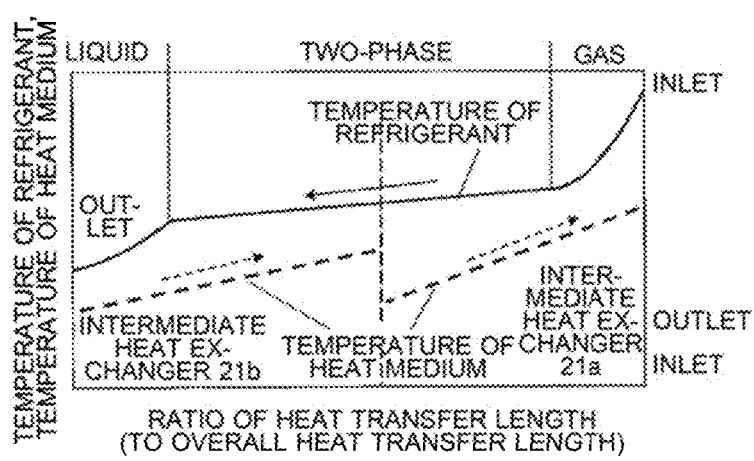
FIG. 14 is an explanatory diagram for an example of the temperature distributions in the intermediate heat exchangers 21a and 21b in the heating only operation of the air-conditioning apparatus according to Embodiment 2 of the present disclosure.

FIG. 14 is an explanatory diagram for an example of temperature distributions in the intermediate heat exchangers 21a and 21b in the heating only operation of the air-conditioning apparatus according to Embodiment 2 of the present disclosure. In this case, it is assumed that the inlet temperatures of the heat mediums are nearly equal to each other. In FIG. 14, the horizontal axis represents specific enthalpy, and the vertical axis represents the temperature of the refrigerant and the temperature of the heat medium. High-temperature and high-pressure gas refrigerant that flows in the intermediate heat exchanger 21a transfers heat to the heat medium having a low temperature, as a result of which the temperature of the refrigerant is lowered, and the refrigerant is changed into two-phase gas-liquid refrigerant when the temperature thereof reaches a saturation temperature. The two-phase gas-liquid refrigerant is kept in a two-phase state at the outlet of the intermediate heat exchanger 21a and flows into the intermediate heat exchanger 21b. In the intermediate heat exchanger 21b, the temperature of the two-phase gas-liquid refrigerant is lowered as heat exchange progresses because of characteristics of the zeotropic refrigerant mixture, and thus the refrigerant is changed into liquid refrigerant. The temperature of the liquid refrigerant is further lowered as the heat exchange progresses. By contrast, the temperature of the heat medium that flows in the intermediate heat exchanger 21a and that of the heat medium that flows in the intermediate heat exchanger 21b are lowered as the heat exchange progresses.

[Advantages of Heating Only Operation Mode]

As described above, in the air-conditioning apparatus 100 of Embodiment 2, the refrigerant that flows in the heat-source-side heat exchanger 13 necessarily flows in the opposite direction to the flow direction of air in the heating operation mode. Therefore, the temperature difference between the refrigerant and air in the heat exchanger is reduced, and the heat exchange efficiency can thus be improved. Furthermore, the refrigerant that flows in the intermediate heat exchangers 21a and 21 b necessarily flows in the opposite flow direction to the flow direction of the heat medium. Therefore, the temperature difference between the refrigerant and the heat medium, which is a heat use medium, in the heat exchanger is reduced, and the heat exchange efficiency can thus be enhanced. In addition, by closing the opening and closing device 52 provided at the return pipe 4c to allow high-pressure liquid refrigerant to flow through the return pipe 4b only, the rate of the refrigerant that circulates in the refrigerant cycle circuit in the air-conditioning apparatus 100 can be reduced in the heating operation mode.

[Cooling Main Operation Mode]

Figure 15:
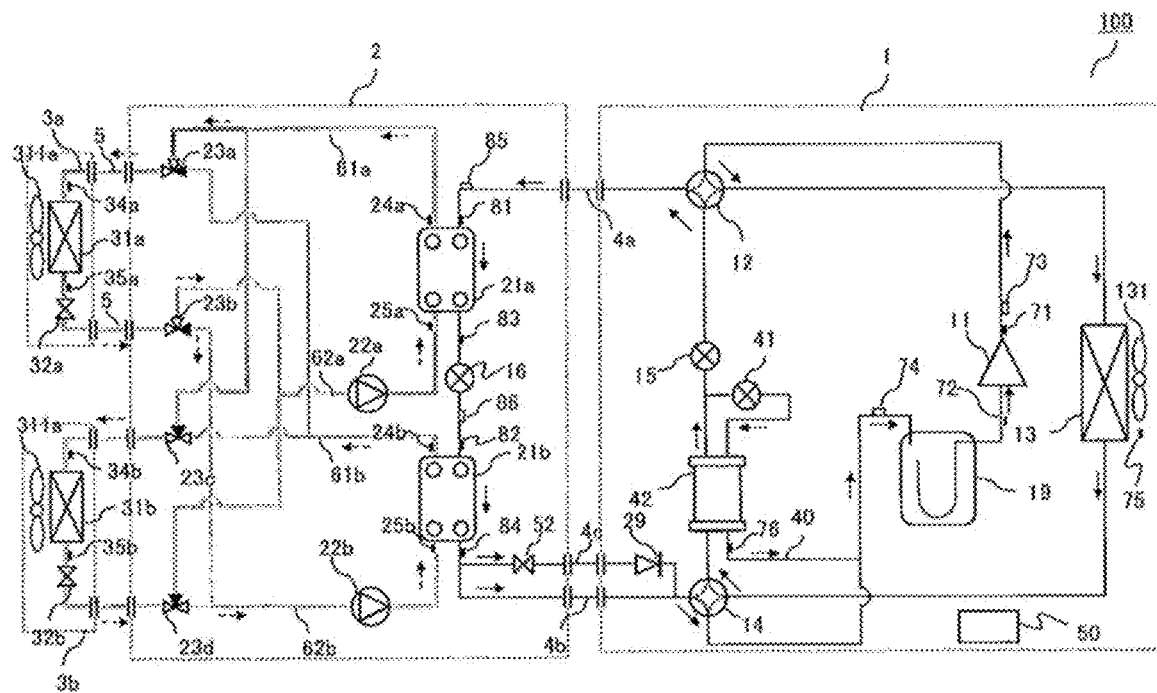
FIG. 15 is an explanatory diagram for an example of the flow of refrigerant, etc., in a cooling main operation of the air-conditioning apparatus according to Embodiment 2 of the present disclosure.

FIG. 15 is an explanatory diagram for an example of the flow of refrigerant, etc., in the cooling main operation of the air-conditioning apparatus according to Embodiment 2 of the present disclosure. The example illustrated in FIG. 15 will be described with respect to the case where in the cooling main operation mode, the indoor unit 3a performs heating and the indoor unit 3b performs cooling.

First of all, operations of components provided in the refrigerant cycle circuit will be described referring to the flow of the refrigerant. The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant discharged from the compressor 11 flows into the heat-source-side heat exchanger 13 via the first flow switching device 12. The heat-source-side heat exchanger 13 causes heat exchange to be performed between outdoor air supplied by the outdoor fan 131 and the high-temperature and high-pressure gas refrigerant. The high-temperature and high-pressure gas refrigerant is cooled by the heat exchange to change into middle-temperature and high-pressure two-phase gas-liquid refrigerant. The middle-temperature and high-pressure two-phase gas-liquid refrigerant obtained through cooling by the heat exchange at the heat-source-side heat exchanger 13 flows into the intermediate heat exchanger 21*a* via the second flow switching device 14, the refrigerant-to-refrigerant heat exchanger 42, the first expansion device 15, the first flow switching device 12, and the supply pipe 4*a*. The intermediate heat exchanger 21*a* causes heat exchange to be performed between middle-temperature and high-pressure two-phase gas-liquid refrigerant and the heat medium that is circulated in the heat-medium cycle circuit by the pump 22*a*. The middle-temperature and high-pressure two-phase gas-liquid refrigerant is condensed at the intermediate heat exchanger 21*a* to change into middle-temperature and high-pressure two-phase gas-liquid refrigerant or liquid refrigerant. The middle-temperature and high-pressure two-phase gas-liquid refrigerant or liquid refrigerant flows into the third expansion device 16. The third expansion device 16 reduces the pressure of the middle-temperature and high-pressure two-phase gas-liquid refrigerant or liquid refrigerant to change the middle-temperature and high-pressure two-phase gas-liquid refrigerant or liquid refrigerant into low-temperature and low-pressure two-phase gas-liquid refrigerant. The low-temperature and low-pressure two-phase gas-liquid refrigerant obtained through pressure-reduction by the third expansion device 16 flows into the intermediate heat exchanger 21*b*. The intermediate heat exchanger 21*b* causes heat exchange to be performed between the low-temperature and low-pressure two-phase gas-liquid refrigerant and the heat medium that is circulated in the heat-medium cycle circuit by the pump 22*b*, whereby the low-temperature and low-pressure two-refrigerant is heated to change into low-temperature and low-pressure two-phase gas-liquid refrigerant or gas refrigerant. The low-temperature and low-pressure two-phase gas-liquid refrigerant or gas refrigerant obtained through heating by heat exchange at the intermediate heat exchanger 21*b* is re-sucked into the compressor 11 via the return pipes 4*b* and 4*c*, the second flow switching device 14 and the accumulator 19.

Next, operations of components provided in the heat-medium cycle circuit will be described referring to the flow of the heat medium. The pump 22*a* sucks and pressurizes the heat medium. The heat medium sent by the pump 22*a* flows into the intermediate heat exchanger 21*a*. The intermediate heat exchanger 21*a* causes heating energy of the refrigerant in the refrigerant cycle circuit to be transferred to the heat medium, and the heat medium heated thereby flows into the use-side heat exchanger 31*a* via the heat-medium supply pipe 61*a*, the heat-medium flow switching device 23*a*, and an associated one of the heat medium pipes 5. At this time, the indoor unit 3*a* performs heating and the use-side heat exchanger 31*a* causes heat exchange to be performed between indoor air supplied by the indoor fan 311*a* and the heat medium having a high temperature. Thus, the indoor air is heated, and the heat medium having a high temperature is cooled to change into a middle-temperature heat medium. The middle-temperature heat medium obtained through cooling by the heat exchange at the use-side heat exchanger 31*a* is re-sucked into the pump 22*a* via the heat-medium flow adjustment device 32*a*, an associated one of the heat medium pipes 5, the heat-medium flow switching device 23*b*, and the heat-medium return pipe 62*a*.

The pump 22*b* sucks and pressurizes the heat medium. The heat medium sent by the pump 22*b* flows into the intermediate heat exchanger 21*b*. The intermediate heat exchanger 21*b* causes cooling energy of the refrigerant in the refrigerant cycle circuit to be transferred to the heat medium, and the heat medium cooled thereby flows into the use-side heat exchanger 31*b* via the heat-medium supply pipe 61*b*, the heat-medium flow switching device 23*b*, and an associated one of the heat medium pipes 5. At this time, the indoor unit 3*b* performs cooling, and the use-side heat exchanger 31*b* causes heat exchange to be performed between indoor air supplied by the indoor fan 311*b* and the heat medium having a low-temperature. Thus, the indoor air is cooled, and the heat medium having a low-temperature is heated to change into a middle-temperature heat medium. The middle-temperature heat medium obtained through heating by the heat exchange at the use-side heat exchanger 31*b* is re-sucked into the pump 22*b* via the heat-medium flow adjustment device 32*b*, an associated one of the heat medium pipes 5, the heat-medium flow switching device 23*d*, and the heat-medium return pipe 62*b*.

[Advantages of Cooling Main Operation Mode]

As described above, in the air-conditioning apparatus 100 of Embodiment 2, the refrigerant that flows in the heat-source-side heat exchanger 13 necessarily flows in the opposite flow direction to the flow direction of air in the cooling main operation mode, that is, couterflow is necessarily achieved. Therefore, the temperature difference between the refrigerant and the air in the heat exchanger is reduced, and the heat exchange efficiency can thus be improved. Furthermore, the refrigerant that flows in the intermediate heat exchangers 21*a* and 21 *b* necessarily flows in the opposite flow direction to the flow direction of the heat medium, that is, counterflow is necessarily achievedd. Therefore, the temperature difference between the refrigerant and the heat medium, which is a heat use medium, in the heat exchanger is reduced, and the heat exchange efficiency can thus be improved. In addition, by providing the return pipes 4*b* and 4*c* parallel to each other and opening the opening and closing device 52 provided at the return pipe 4*c*, the refrigerant is caused to flow through both the return pipe 4*b* and the return pipe 4*c*. Thus, the cross-sectional area of the pipes through which low-temperature and low-pressure two-phase gas-liquid refrigerant or gas refrigerant passes is increased, and thus the pressure loss on a low pressure side in the refrigerant cycle circuit can be reduced. It is therefore possible to reduce the performance deterioration.

[Heating Main Operation Mode]

Figure 16:
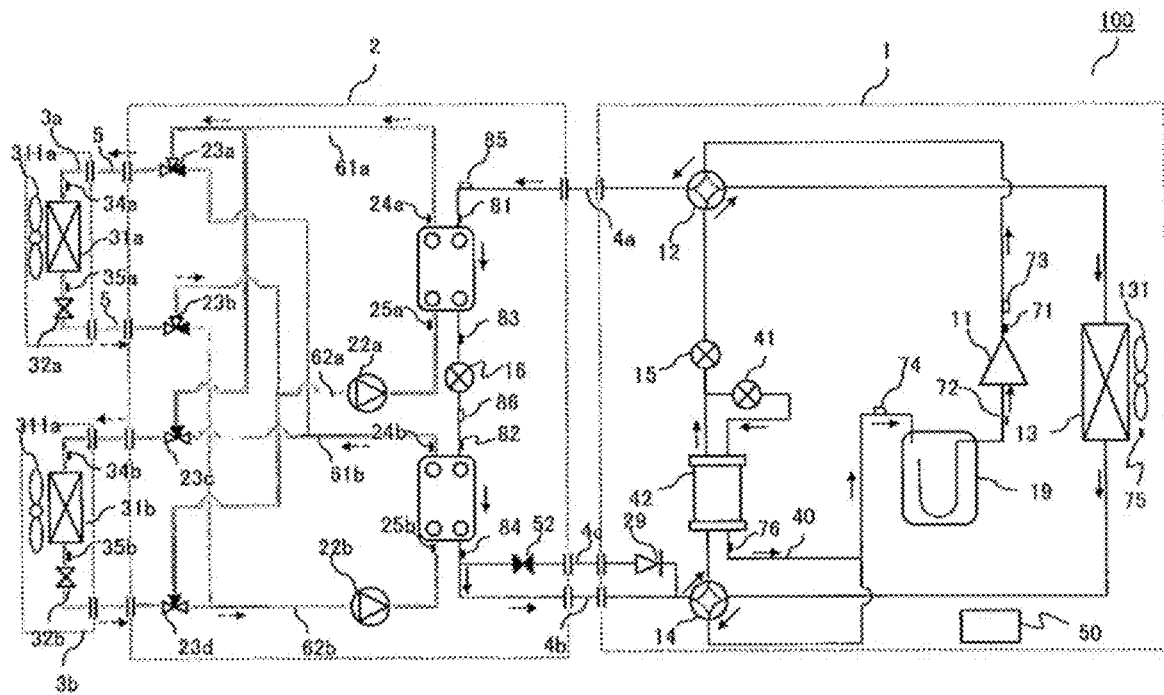
FIG. 16 is an explanatory diagram for an example of the flow of refrigerant, etc., in a heating main operation of the air-conditioning apparatus according to Embodiment 2 of the present disclosure.

FIG. 16 is an explanatory diagram for an example of the flow of refrigerant, etc., in the heating main operation of the air-conditioning apparatus according to Embodiment 2 of the present disclosure. The example illustrated in FIG. 16 will be described referring to the case where in the heating main operation mode, the indoor unit 3*a* performs heating and the indoor unit 3*b* performs cooling.

First of all, operations of components in the refrigerant cycle circuit side will be described referring to the flow of the refrigerant. The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant flows into the intermediate heat exchanger 21a via the first flow switching device 12 and the supply pipe 4a. The intermediate heat exchanger 21a causes heat exchange to be performed between the high-temperature and high-pressure gas refrigerant and the heat medium that is circulated in the heat-medium cycle circuit by the pump 22a, whereby the high-temperature and high-pressure gas refrigerant is cooled to change into middle-temperature and high-pressure two-phase gas-liquid refrigerant or liquid refrigerant. The middle-temperature and high-pressure two-phase gas-liquid refrigerant or liquid refrigerant obtained through cooling by the heat exchange at the intermediate heat exchanger 21a flows into the third expansion device 16. The third expansion device 16 reduces the pressure of the middle-temperature and high-pressure two-phase gas-liquid refrigerant or liquid refrigerant to change the middle-temperature and high-pressure two-phase gas-liquid refrigerant or liquid refrigerant into low-temperature and low-pressure two-phase gas-liquid refrigerant. The low-temperature and low-pressure two-phase gas-liquid refrigerant obtained through the pressure-reduction by the third expansion device 16 flows into the intermediate heat exchanger 21b. The intermediate heat exchanger 21b causes heat exchange to be performed between low-temperature and low-pressure two-phase gas-liquid refrigerant and the heat medium that is circulated in the heat-medium cycle circuit by the pump 22b, whereby the low-temperature and low-pressure two-phase gas-liquid refrigerant is heated to change into low-temperature and low-pressure two-phase gas-liquid refrigerant. The low-temperature and low-pressure two-phase gas-liquid refrigerant obtained through heating by the heat exchange at the intermediate heat exchanger 21b passes through the return pipes 4b and 4c and flows into the first expansion device 15 via the second flow switching device 14 and the refrigerant-to-refrigerant heat exchanger 42. The first expansion device 15 reduces the pressure of the low-temperature and low-pressure two-phase gas-liquid refrigerant. The low-temperature and low-pressure two-phase gas-liquid refrigerant subjected to pressure-reduction by the first expansion device 15 flows into the heat-source-side heat exchanger 13 via the first flow switching device 12. The heat-source-side heat exchanger 13 causes heat exchange to be performed between outdoor air supplied by the outdoor fan 131 and the low-temperature and low-pressure two-phase gas-liquid refrigerant, whereby the low-temperature and low-pressure two-phase gas-liquid refrigerant is heated to change into low-temperature and low-pressure gas refrigerant or two-phase gas-liquid refrigerant. The low-temperature and low-pressure gas refrigerant or two-phase gas-liquid refrigerant obtained through heating by the heat exchange at the heat-source-side heat exchanger 13 is re-sucked into the compressor 11 via the second flow switching device 14 and the accumulator 19.

Next, operations of components in the heat-medium cycle circuit will be described referring to the flow of the heat medium. The pump 22a sucks and pressurizes the heat medium. The heat medium sent by the pump 22a flows into the intermediate heat exchanger 21a. The intermediate heat exchanger 21a causes heating energy of the refrigerant in the refrigerant cycle circuit to be transferred to the heat medium, and the heat medium heated thereby flows into the use-side heat exchanger 31a via the heat-medium supply pipe 61a, the heat-medium flow switching device 23a, and an associated one of the heat medium pipes 5. At this time, the indoor unit 3a performs heating, and the use-side heat exchanger 31a causes heat exchange to be performed between indoor air supplied by the indoor fan 311a and the heat medium having a high-temperature. Thus, the indoor air is heated, and the heat medium having a high-temperature is cooled to change into a middle-temperature heat medium. The middle-temperature heat medium obtained through cooling by the heat exchange at the use-side heat exchanger 31a is re-sucked into the pump 22a via the heat-medium flow adjustment device 32a, an associated one of the heat medium pipes 5, the heat-medium flow switching device 23b, and the heat-medium return pipe 62a.

The pump 22b sucks and pressurizes the heat medium. The heat medium sent by the pump 22b flows into the intermediate heat exchanger 21b. The intermediate heat exchanger 21b causes cooling energy of the refrigerant in the refrigerant cycle circuit to be transferred to the heat medium, and the heat medium cooled thereby flows into the use-side heat exchanger 31b via the heat-medium supply pipe 61b, the heat-medium flow switching device 23b, and an associated one of the heat medium pipes 5. At this time, the indoor unit 3b performs cooling, and the use-side heat exchanger 31b causes heat exchange to be performed between indoor air supplied by the indoor fan 311b and the heat medium having a low-temperature. Thus, the indoor air is cooled, and the heat medium having a low-temperature is heated to change into a middle-temperature heat medium. The middle-temperature heat medium obtained through heating by the heat exchange at the use-side heat exchanger 31b is re-sucked into the pump 22b via the heat-medium flow adjustment device 32b, an associated one of the heat medium pipes 5, the heat-medium flow switching device 23d, and the heat-medium return pipe 62b.

[Advantages of Heating Main Operation Mode]

As described above, in the air-conditioning apparatus 100 of Embodiment 2, the refrigerant that flows in the heat-source-side heat exchanger 13 necessarily flows in the opposite flow direction to the flow direction of air in the heating main operation mode, that is, counterflow is necessarily achieved. Therefore, the temperature difference between the refrigerant and the air in the heat exchanger is reduced, and the heat exchange efficiency can thus be improved. Furthermore, the refrigerant that flows in the intermediate heat exchanger 21a or 21 b necessarily flows in the opposite flow direction to the flow direction of the heat medium, that is, counterflow is necessarily achieved. Therefore, the temperature difference between the refrigerant and the heat medium, which is a heat use medium, in the heat exchanger is reduced, and the heat exchange efficiency can thus be improved. In addition, by providing the return pipes 4b and 4c parallel to each other and opening the opening and closing device 52 provided at the return pipe 4c, the refrigerant is caused to flow through both of the return pipe 4b and the return pipe 4c. Thus, the cross-sectional area of the pipes through which low-temperature and low-pressure two-phase gas-liquid refrigerant or gas refrigerant passes is increased, and the pressure loss on a low pressure side can be reduced in the refrigerant cycle circuit. It is therefore possible to reduce the performance deterioration.

Embodiment 3

[Air-Conditioning Apparatus 100]

Figure 17:
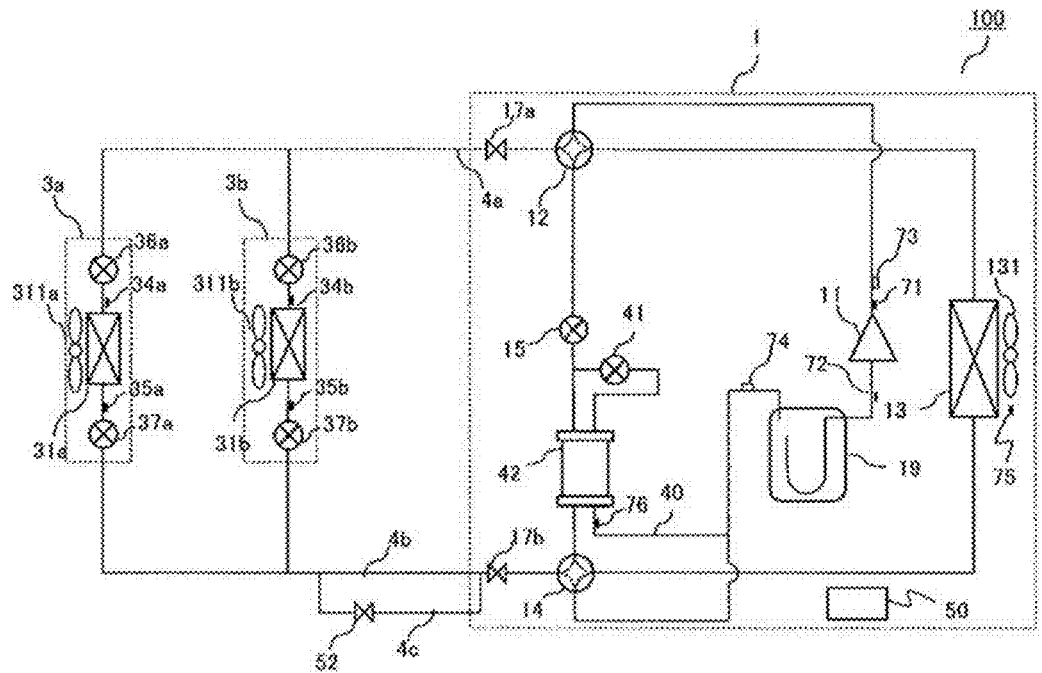
FIG. 17 is an explanatory diagram for an example of the configuration of circuits and other components in an air-conditioning apparatus according to Embodiment 3 of the present disclosure.

FIG. 17 is a schematic diagram illustrating an example of the configuration of circuits, etc. in an air-conditioning apparatus according to Embodiment 3 of the present disclosure. For each of the indoor units 3 in the air-conditioning apparatus 100 of Embodiment 3, it is possible to select a cooling operation mode or a heating operation mode to cause each indoor unit 3 to operate in the selected operation mode. It should be noted that Embodiment 3 will be describe mainly by referring to the differences between the air-conditioning apparatus according to Embodiment 3 and the air-conditioning apparatus 100 of Embodiment 1, for example. Regarding Embodiment 3, components that do, for example, similar operations to those of components as described regarding Embodiment 1 will be denoted by the same reference signs.

In the air-conditioning apparatus 100 of Embodiment 3, the outdoor unit 1 and the indoor units 3 are connected by the supply pipe 4a and the return pipes 4b and 4c to form a refrigerant cycle circuit. FIG. 17 illustrates by way of example the case where two indoor units 3a and 3b are connected to the outdoor unit 1 in parallel, but three or more indoor units 3 may be provided.

[Outdoor Unit 1]

The outdoor unit 1 of Embodiment 3 includes an opening and closing device 17a and an opening and closing device 17b. The opening and closing device 17a and the opening and closing device 17b control passage of refrigerant between the outdoor unit 1 and the indoor units 3a and 3b. For example, when a leak of the refrigerant occurs at a device other than the outdoor unit 1, the opening and closing device 17a and the opening and closing device 17b are closed to prevent refrigerant that remains in the outdoor unit 1 from flowing out from the outdoor unit 1.

[Indoor Units 3]

The indoor unit 3a of Embodiment 3 includes the use-side heat exchanger 31a, a first indoor expansion device 36a, and a second indoor expansion device 37a. The indoor unit 3b of Embodiment 3 includes the use-side heat exchanger 31b, a first indoor expansion device 36b, and a second indoor expansion device 37b. The first indoor expansion device 36a, the first indoor expansion device 36b, the second indoor expansion device 37a, and the second indoor expansion device 37b operate as pressure reducing valves or expansion valves that reduces the pressure of the refrigerant and thereby expands the refrigerant. The first indoor expansion device 36a, the first indoor expansion device 36b, the second indoor expansion device 37a, and the second indoor expansion device 37b may be, for example, electronic expansion valves or similar devices whose opening degrees can be controlled. The first indoor expansion device 36a is provided at a pipe between the supply pipe 4a and the use-side heat exchanger 31a, and the first indoor expansion device 36b is provided at a pipe between the supply pipe 4a and the use-side heat exchanger 31b. The second indoor expansion device 37a is provided at a pipe between the return pipes 4b and 4c and the use-side heat exchanger 31a, and the second indoor expansion device 37b is provided at a pipe between the return pipes 4b and 4c and the use-side heat exchanger 31b.

[Cooling Operation Mode]

Figure 18:
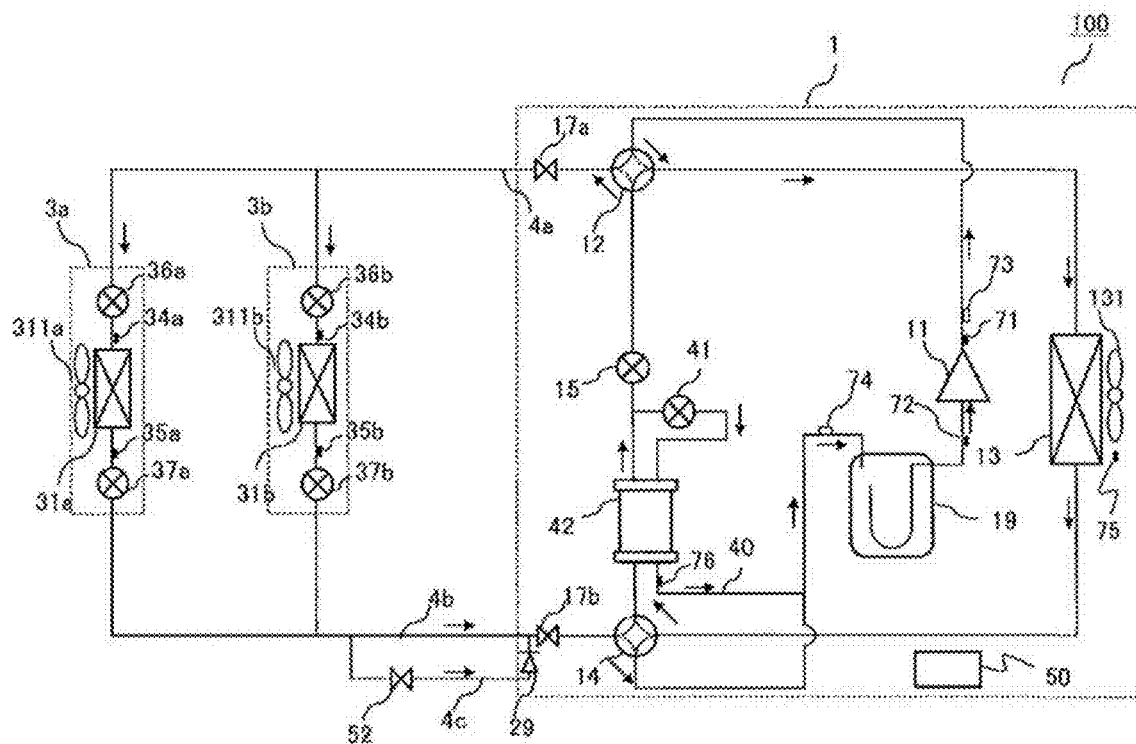
FIG. 18 is an explanatory diagram for an example of the flow of refrigerant, etc. and other fluid in a cooling operation of the air-conditioning apparatus according to Embodiment 3 of the present disclosure.

FIG. 18 is an explanatory diagram for an example of the flow of refrigerant, etc., in the cooling operation of the air-conditioning apparatus according to Embodiment 3 of the present disclosure. The example illustrated in FIG. 18 will be described with respect to the case where in the cooling operation mode, both the indoor unit 3a and the indoor unit 3b perform cooling.

First of all, operations of components provide in the refrigerant cycle circuit will be described referring to the flow of the refrigerant. The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant The high-temperature and high-pressure gas refrigerant discharged from the compressor 11 flows into the heat-source-side heat exchanger 13 via the first flow switching device 12. The heat-source-side heat exchanger 13 causes heat exchange to be performed between outdoor air supplied by the outdoor fan 131 and the high-temperature and high-pressure gas refrigerant. The high-temperature and high-pressure gas refrigerant is cooled by the heat exchange to change into middle-temperature and high-pressure liquid refrigerant. The middle-temperature and high-pressure liquid refrigerant obtained through cooling by the heat exchange at the heat-source-side heat exchanger 13 flows into the refrigerant-to-refrigerant heat exchanger 42 via the second flow switching device 14. The refrigerant-to-refrigerant heat exchanger 42 causes heat exchange to be performed between low-temperature and low-pressure two-phase gas-liquid refrigerant that flows in the bypass circuit 40 and the middle-temperature and high-pressure liquid refrigerant that flows between the second flow switching device 14 and the first expansion device 15. The middle-temperature and high-pressure liquid refrigerant is cooled by the heat exchange to change into low-temperature and high-pressure liquid refrigerant. The low-temperature and high-pressure liquid refrigerant obtained through cooling at the refrigerant-to-refrigerant heat exchanger 42 flows into the first indoor expansion device 36a and the first indoor expansion device 36b via the first expansion device 15, the first flow switching device 12, the opening and closing device 17a, and the supply pipe 4a. The first indoor expansion device 36a and the first indoor expansion device 36b reduce the pressure of the low-temperature and high-pressure liquid refrigerant, whereby the low-temperature and high-pressure liquid refrigerant is changed into low-temperature and low-pressure two-phase gas-liquid refrigerant. The low-temperature and low-pressure two-phase gas-liquid refrigerant obtained through pressure-reduction by the first indoor expansion device 36a and the first indoor expansion device 36b flows into the use-side heat exchanger 31a and the use-side heat exchanger 31b. At this time, the indoor unit 3a and the indoor unit 3b perform cooling, and the use-side heat exchanger 31a and the use-side heat exchanger 31b cause heat exchange to be performed between the low-temperature and low-pressure two-phase gas-liquid refrigerant and indoor air supplied by the indoor fan 311a and the indoor fan 311b, whereby the low-temperature and low-pressure two-phase gas-liquid refrigerant is heated to change into low-temperature and low-pressure gas refrigerant. The low-temperature low-pressure gas refrigerant passes through the return pipes 4b and 4c via the second indoor expansion device 37a and the second indoor expansion device 37b. The low-temperature and low-pressure gas refrigerant further passes through the second flow switching device 14 and the accumulator 19, and is re-sucked into the compressor 11. In this case, the opening and closing device 52 is opened.

[Advantages of Cooling Operation Mode]

As described above, in the air-conditioning apparatus 100 of Embodiment 3, the refrigerant that flows in the heatsource-side heat exchanger 13 necessarily flows in the opposite flow direction to the flow direction of air in the cooling operation mode, that is, counterflow is necessarily achieved. Therefore, the temperature difference between the refrigerant and the air in the heat exchanger is reduced, and the heat exchange efficiency can thus be improved. Also, the refrigerant that flows in the use-side heat exchanger 31a or 31 b necessarily flows in the opposite flow direction to the flow direction of indoor air, that is, counterflow is necessarily achieved. Therefore, the temperature difference between the refrigerant and the indoor air, which is a heat use medium, in the heat exchanger is reduced, and the heat exchange efficiency can thus be improved. Furthermore, by providing the return pipes 4b and 4c parallel to each other and opening the opening and closing device 52 provided at the return pipe 4c, the refrigerant is caused to flow through both the return pipe 4b and the return pipe 4c. Thus, the cross-sectional area of the pipes through which low-temperature and low-pressure two-phase gas-liquid refrigerant or gas refrigerant passes is increased, and the pressure loss can be reduced. It is therefore possible to reduce the performance deterioration.

[Heating Operation Mode]

Figure 19:
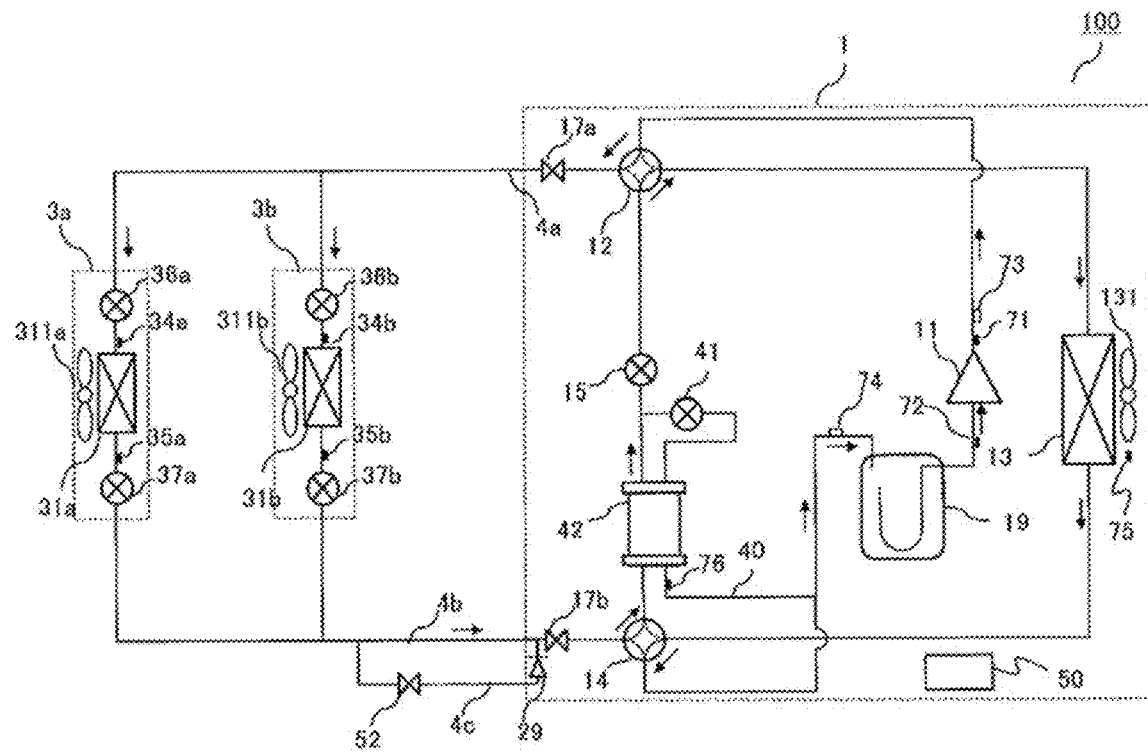
FIG. 19 is an explanatory diagram for an example of the flow of refrigerant, etc. and other fluid in a heating operation of the air-conditioning apparatus according to Embodiment 3 of the present disclosure.

FIG. 19 is an explanatory diagram for an example of the flow of refrigerant, etc., in the heating operation of the air-conditioning apparatus according to Embodiment 3 of the present disclosure. The example illustrated in FIG. 19 will be described with respect to the case where in the heating operation mode, both the indoor unit 3a and the indoor unit 3b perform heating.

The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant discharged from the compressor 11 flows into the use-side heat exchanger 31a and the use-side heat exchanger 31b via the first flow switching device 12, the opening and closing device 17a, the supply pipe 4a, and the first indoor expansion device 36a and first indoor expansion device 36b. In this mode, the indoor unit 3a and the indoor unit 3b perform heating, and the use-side heat exchanger 31a and the use-side heat exchanger 31b causes heat exchange to be performed between the high-temperature and high-pressure gas refrigerant and indoor air supplied by the indoor fan 311a and the indoor fan 311b. The high-temperature and high-pressure gas refrigerant is cooled by the heat exchange to change into middle-temperature and high-pressure liquid refrigerant. The middle-temperature and high-pressure liquid refrigerant passes through the return pipe 4b via the second indoor expansion device 37a and the second indoor expansion device 37b. In this case, the opening and closing device 52 is closed to prevent the refrigerant from passing through the return pipe 4c. The middle-temperature and high-temperature liquid refrigerant further flows into the first expansion device 15 via the second flow switching device 14 and the refrigerant-to-refrigerant heat exchanger 42. The first expansion device 15 reduces the pressure of the middle-temperature and high-pressure liquid refrigerant, whereby the middle-temperature and high-pressure liquid refrigerant is changed into low-temperature and low-pressure two-phase gas-liquid refrigerant. The low-temperature and low-pressure two-phase gas-liquid refrigerant obtained through pressure-reduction by the first expansion device 15 flows into the heat-source-side heat exchanger 13 via the first flow switching device 12. The heat-source-side heat exchanger 13 causes heat exchange to be performed between outdoor air supplied by the outdoor fan 131 and the low-temperature and low-pressure two-phase gas-liquid refrigerant, whereby the low-temperature and low-pressure two-phase gas-liquid refrigerant is heated to change into low-temperature and low-pressure gas refrigerant or two-phase gas-liquid refrigerant. The low-temperature and low-pressure gas refrigerant or two-phase gas-liquid refrigerant obtained through heating by the heat exchange at the heat-source-side heat exchanger 13 is re-sucked into the compressor 11 via the second flow switching device 14 and the accumulator 19.

[Advantages of Heating Operation Mode]

As described above, in the air-conditioning apparatus 100 of Embodiment 3, the refrigerant that flows in the heat-source-side heat exchanger 13 necessarily flows in the opposite flow direction to the flow direction of air in the heating operation mode, that is, counterflow is necessarily achieved. Therefore, the temperature difference between the refrigerant and the air in the heat exchanger is reduced, and the heat exchange efficiency can thus be improved. Furthermore, the refrigerant that flows in the use-side heat exchanger 31a or 31 b necessarily flows in the opposite flow direction to the flow direction of the indoor air, that is, counterflow is necessarily achieved. Therefore, the temperature difference between the refrigerant and the indoor air, which is a heat use medium, in the heat exchanger is reduced, and the heat exchange efficiency can thus be improved. In addition, by closing the opening and closing device 52 provided at the return pipe 4c to allow high-pressure liquid refrigerant to flow through the return pipe 4b only, it is possible to reduce the flow rate of the refrigerant circulating in the refrigerant cycle circuit in the air-conditioning apparatus 100 in the heating operation mode.

Embodiment 4

[Air-Conditioning Apparatus 100]

Figure 20:
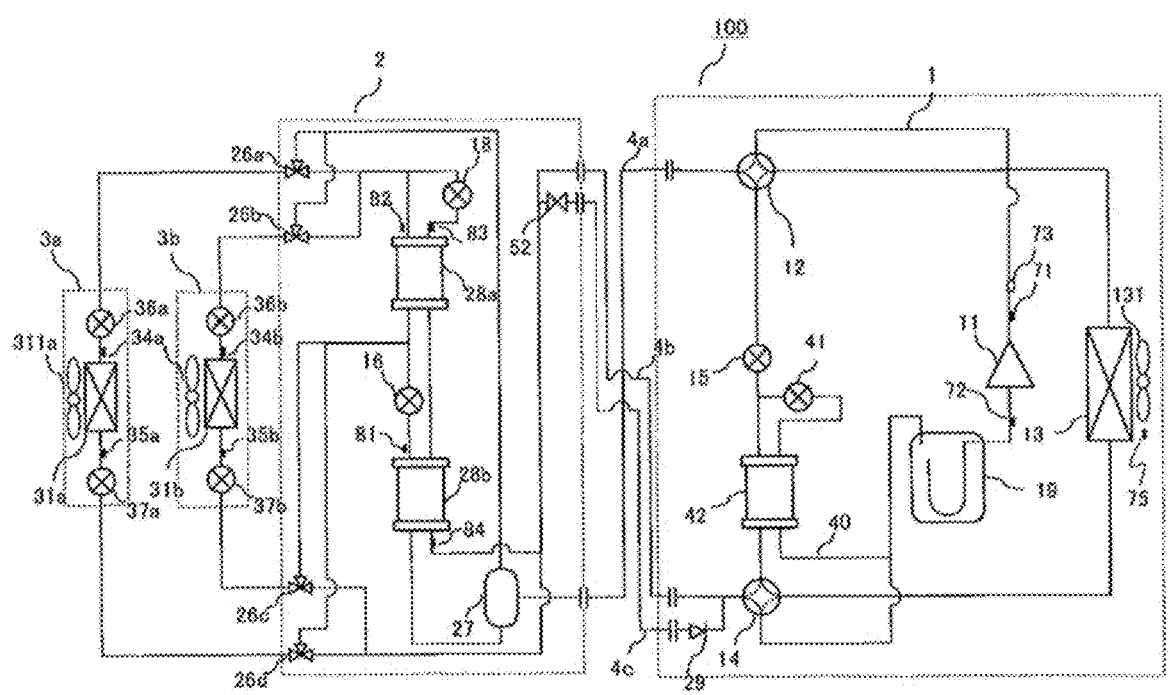
FIG. 20 is an explanatory diagram for an example of the configuration of circuits and other components in an air-conditioning apparatus according to Embodiment 4 of the present disclosure.

FIG. 20 is a schematic diagram illustrating an example of the configuration of circuits, etc. in an air-conditioning apparatus according to Embodiment 4 of the present disclosure. For each of the indoor units 3 of the air-conditioning apparatus 100 of Embodiment 4, it is possible to select a cooling operation mode or a heating operation mode. Embodiment 4 will be described mainly by referring to the differences between the air-conditioning apparatus according to Embodiment 4 and, for example, the air-conditioning apparatus 100 of Embodiment 1. Regarding Embodiment 4, components that perform similar operations to those described regarding Embodiment 1 will be denoted by the same reference sings.

In the air-conditioning apparatus 100 of Embodiment 4, the outdoor unit 1 and the indoor units 3 are connected by the supply pipe 4a and the return pipes 4b and 4c to form a refrigerant cycle circuit. FIG. 20 illustrates by way of example the case where two indoor units 3a and 3b are connected to the outdoor unit 1 in parallel, but three or more indoor units 3 may be provided.

[Relay Unit 2]

For example, in a building, the relay unit 2 of Embodiment 4 is installed in a non-air-conditioned space, not air-conditioned spaces in which the indoor units 3 are installed. The relay unit 2 includes a gas-liquid separator 27, a refrigerant-to-refrigerant heat exchanger 28a, a refrigerant-to-refrigerant heat exchanger 28b, the third expansion device 16, a fourth expansion device 18, a refrigerant flow switching device 26a, a refrigerant flow switching device 26b, a refrigerant flow switching device 26c, and a refrigerant flow switching device 26d.

The refrigerant-to-refrigerant heat exchanger 28a and the refrigerant-to-refrigerant heat exchanger 28b are, for example, double-pipe heat exchangers. The refrigerant-to-refrigerant heat exchanger 28a and the refrigerant-to-refrigerant heat exchanger 28b cause heat exchange to be performed between middle-temperature and high-pressure refrigerant that flows out from the gas-liquid separator 27 and low-temperature and low-pressure refrigerant that flows out from the fourth expansion device 18.

The refrigerant flow switching devices 26 (the refrigerant flow switching device 26a, the refrigerant flow switching device 26b, the refrigerant flow switching device 26c, and the refrigerant flow switching device 26d) are, for example, three-way switching valves. The refrigerant flow switching devices 26 each switch the flow passage for the refrigerant between a flow passage for use in the cooling operation mode and that for use in the heating operation mode. One of ends of each of the refrigerant flow switching device 26a and the refrigerant flow switching device 26b is connected to an associated one of the indoor units 3, one of remaining ones of the ends of each of the refrigerant flow switching device 26a and the refrigerant flow switching device 26b is connected to the refrigerant-to-refrigerant heat exchanger 28a, and the other of the above remaining ends of each of the refrigerant flow switching device 26a and the refrigerant flow switching device 26b is connected to one end of the gas-liquid separator 27. The refrigerant flow switching device 26a and the refrigerant flow switching device 26b switch the flow passage on a refrigerant inflow side of the use-side heat exchanger 31a and the flow passage on a refrigerant inflow side of the use-side heat exchanger 31b, respectively. Furthermore, one of ends of each of the refrigerant flow switching device 26c and the refrigerant flow switching device 26d is connected to an associated one of the indoor units 3, one of remaining ones of the ends of each of the refrigerant flow switching device 26c and the refrigerant flow switching device 26d is connected to a pipe connecting between the refrigerant-to-refrigerant heat exchanger 28a and the refrigerant-to-refrigerant heat exchanger 28b, and the other of the above remaining ends of each of the refrigerant flow switching device 26c and the refrigerant flow switching device 26d is connected to the return pipes 4b and 4c. The refrigerant flow switching device 26c and the refrigerant flow switching device 26d switch the flow passage on a refrigerant outflow side of the use-side heat exchanger 31a and flow passage on a refrigerant outflow side of the use-side heat exchanger 31b, respectively.

In addition, the relay unit 2 of Embodiment 4 includes the refrigerant temperature sensor 81, the refrigerant temperature sensor 82, the refrigerant temperature sensor 83, and the refrigerant temperature sensor 84. The refrigerant temperature sensor 81 detects the temperature of the refrigerant on an inlet side of the refrigerant-to-refrigerant heat exchanger 28b. The refrigerant temperature sensor 82 detects the temperature of the refrigerant on an outlet side of the refrigerant-to-refrigerant heat exchanger 28a. The refrigerant temperature sensor 83 detects the temperature of the heat medium on an inlet side of the refrigerant-to-refrigerant heat exchanger 28a. The refrigerant temperature sensor 84 detects the temperature of the heat medium on an outlet side of the refrigerant-to-refrigerant heat exchanger 28b.

[Cooling Operation Mode]

Figure 21:
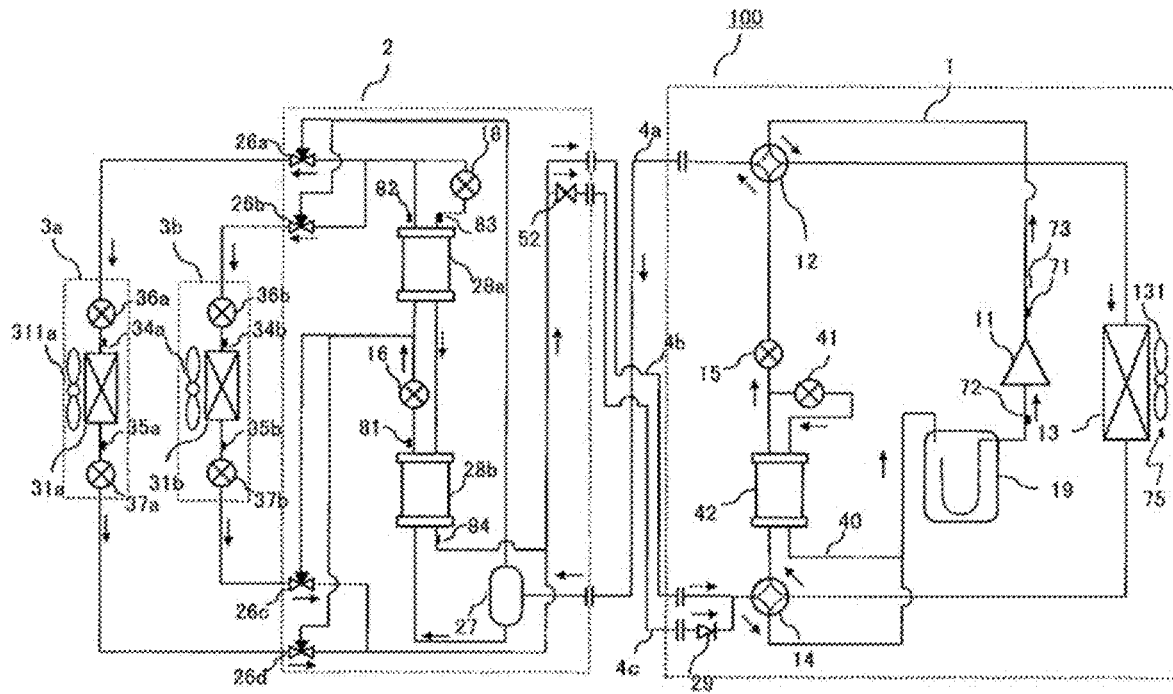
FIG. 21 is an explanatory diagram for an example of the flow of refrigerant, etc., in a cooling operation of the air-conditioning apparatus according to Embodiment 4 of the present disclosure.

FIG. 21 is an explanatory diagram for an example of the flow of refrigerant, etc., in the cooling operation of the air-conditioning apparatus according to Embodiment 4 of the present disclosure. The example illustrated in FIG. 21 will be described with respect to the case where in the cooling operation mode, both the indoor unit 3a and the indoor unit 3b perform cooling.

The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant discharged from the compressor 11 flows into the heat-source-side heat exchanger 13 via the first flow switching device 12. The heat-source-side heat exchanger 13 causes heat exchange to be performed between outdoor air supplied by the outdoor fan 131 and the high-temperature and high-pressure gas refrigerant. The high-temperature and high-pressure gas refrigerant is cooled by the heat exchange to change into middle-temperature and high-pressure liquid refrigerant. The middle-temperature and high-pressure liquid refrigerant obtained through cooling by the heat exchange at the heat-source-side heat exchanger 13 flows into the refrigerant-to-refrigerant heat exchanger 42 via the second flow switching device 14. The refrigerant-to-refrigerant heat exchanger 42 causes heat exchange to be performed between low-temperature and low-pressure two-phase gas-liquid refrigerant that flows in the bypass circuit 40 and the middle-temperature and high-pressure liquid refrigerant that flows between the second flow switching device 14 and the first expansion device 15. The middle-temperature and high-pressure liquid refrigerant is cooled by the heat exchange to change into low-temperature and high-pressure liquid refrigerant. The low-temperature and high-pressure liquid refrigerant obtained through cooling by the heat exchange at the refrigerant-to-refrigerant heat exchanger 42 flows into the gas-liquid separator 27 via the first expansion device 15, the first flow switching device 12, and the supply pipe 4a. The low-temperature and high-pressure liquid refrigerant flows into the first indoor expansion device 36a and the first indoor expansion device 36b via the third expansion device 16, the refrigerant-to-refrigerant heat exchanger 28a, and the refrigerant flow switching device 26a and the refrigerant flow switching device 26b. The first indoor expansion device 36a and the first indoor expansion device 36b reduce the pressure of the low-temperature and high-pressure liquid refrigerant, whereby the low-temperature and high-pressure liquid refrigerant is changed into low-temperature and low-pressure two-phase gas-liquid refrigerant. The low-temperature and low-pressure two-phase gas-liquid refrigerant obtained through pressure-reduction by the first indoor expansion device 36a and the first indoor expansion device 36b flows into the use-side heat exchanger 31a and the use-side heat exchanger 31b. At this time, the indoor unit 3a and the indoor unit 3b perform cooling, and the use-side heat exchanger 31a and the use-side heat exchanger 31b cause heat exchange to be performed between the low-temperature and low-pressure two-phase gas-liquid refrigerant and indoor air supplied by the indoor fan 311a and the indoor fan 311b. The low-temperature and low-pressure two-phase gas-liquid refrigerant is heated by the heat exchange to change into low-temperature and low-pressure gas refrigerant. The low-temperature and low-pressure gas refrigerant flows into the return pipe 4b and 4c via the second indoor expansion device 37a, the second indoor expansion device 37b, the refrigerant flow switching device 26c, and the refrigerant flow switching device 26d. The low-temperature and low-pressure gas refrigerant is re-sucked into the compressor 11 via the second flow switching device 14 and the accumulator 19. At this time, the opening and closing device 52 is opened.

[Advantages of Cooling Operation Mode]

As described above, in the air-conditioning apparatus 100 of Embodiment 4, the refrigerant that flows in the heat-source-side heat exchanger 13 necessarily flows in the opposite flow direction to the flow direction of air in the cooling operation mode, that is, counterflow is necessarily achieved. Therefore, the temperature difference between the refrigerant and the air in the heat exchanger is reduced, and the heat exchange efficiency can thus be improved. Furthermore, the refrigerant that flows in the use-side heat exchanger 31a or 31 b necessarily flows in the opposite flow direction to the flow direction of the indoor air, that is, counterflow is necessarily achieved. Therefore, the temperature difference between the refrigerant and the indoor air, which is a heat use medium, in the heat exchanger is reduced, and the heat exchange efficiency can thus be improved. In addition, by providing the return pipes 4b and 4c parallel to each other and by opening the opening and closing device 52 provided at the return pipe 4c, the refrigerant is caused to flow through both the return pipe 4b and the return pipe 4c. Thus, the cross-sectional area of the pipes through which the low-temperature and low-pressure two-phase gas-liquid refrigerant or gas refrigerant passes is increased, and the pressure loss can thus be reduced. It is therefore possible to reduce the performance deterioration.

[Heating Operation Mode]

Figure 22:
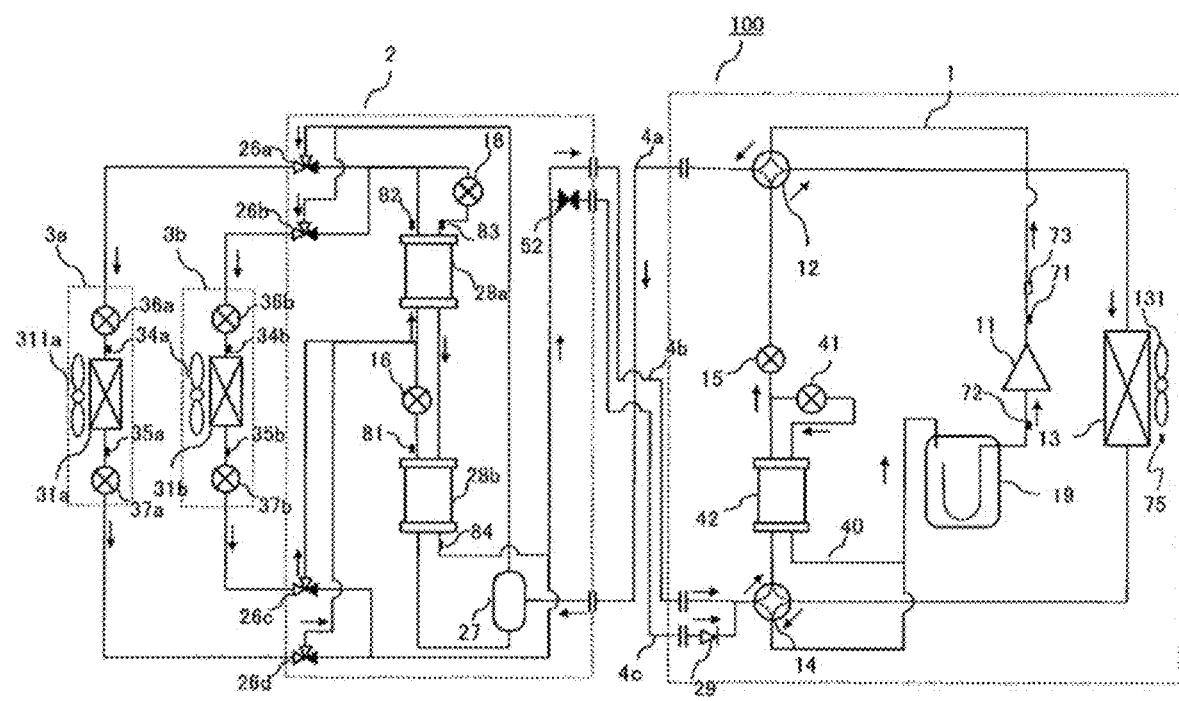
FIG. 22 is an explanatory diagram for an example of the flow of refrigerant, etc., in a heating operation of the air-conditioning apparatus according to Embodiment 4 of the present disclosure.

FIG. 22 is an explanatory diagram for the flow of refrigerant, etc., in the heating operation of the air-conditioning apparatus according to Embodiment 4 of the present disclosure. The example illustrated in FIG. 22 will be described with respect to the case where in heating operation mode, both the indoor unit 3a and the indoor unit 3b perform heating.

The compressor 11 sucks low-temperature and low-pressure gas refrigerant, compresses the low-temperature and low-pressure gas refrigerant into high-temperature and high-pressure gas refrigerant, and discharges the high-temperature and high-pressure gas refrigerant. The high-temperature and high-pressure gas refrigerant discharged from the compressor 11 flows into the gas-liquid separator 27 via the first flow switching device 12, the opening and closing device 17a, and the supply pipe 4a. The high-temperature and high-pressure gas refrigerant that has flowed into the gas-liquid separator 27 flows into the use-side heat exchanger 31a and the use-side heat exchanger 31b via the refrigerant flow switching device 26a and the first indoor expansion device 36a and via the refrigerant flow switching device 26b and the first indoor expansion device 36b. At this time, the indoor unit 3a and the indoor unit 3b perform heating, and the use-side heat exchanger 31a and the use-side heat exchanger 31b cause heat exchange to be performed between high-temperature and high-pressure gas refrigerant and indoor air supplied by the indoor fan 311a and the indoor fan 311b. The high-temperature and high-pressure gas refrigerant is cooled by the heat exchange to change into middle-temperature and high-pressure liquid refrigerant. The middle-temperature and high-pressure liquid refrigerant passes through the return pipe 4b via the second indoor expansion device 37a and the second indoor expansion device 37b, and the refrigerant flow switching device 26c and the refrigerant flow switching device 26d. In this case, the opening and closing device 52 is closed and thus the refrigerant does not pass through the return pipe 4c. The middle-temperature and high-pressure liquid refrigerant further flows into the first expansion device 15 via the second flow switching device 14 and the refrigerant-to-refrigerant heat exchanger 42. The first expansion device 15 reduces the pressure of the middle-temperature and high-pressure liquid refrigerant, whereby the middle-temperature and high-pressure liquid refrigerant is changed into low-temperature and low-pressure two-phase gas-liquid refrigerant. The low-temperature and low-pressure two-phase gas-liquid refrigerant obtained through pressure-reduction by the first expansion device 15 flows into the heat-source-side heat exchanger 13 via the first flow switching device 12. The heat-source-side heat exchanger 13 causes heat exchange to be performed between outdoor air supplied by the outdoor fan 131 and the low-temperature and low-pressure two-phase gas-liquid refrigerant, whereby the low-temperature and low-pressure two-phase gas-liquid refrigerant is heated to change into low-temperature and low-pressure gas refrigerant or two-phase gas-liquid refrigerant. The low-temperature and low-pressure gas refrigerant or two-phase gas-liquid refrigerant obtained through heating by the heat exchange at the heat-source-side heat exchanger 13 is re-sucked into the compressor 11 via the second flow switching device 14 and the accumulator 19.

[Advantages of Heating Operation Mode]

As described above, in the air-conditioning apparatus 100 of Embodiment 4, the refrigerant that flows in the heat-source-side heat exchanger 13 necessarily flows in the opposite flow direction to the flow direction of air in the heating operation mode, that is, counterflow is necessarily achieved. Thus, the temperature difference between the refrigerant and the air in the heat exchanger is reduced, and the heat exchange efficiency can thus be improved. Furthermore, the refrigerant that flows in the use-side heat exchangers 31a and 31 b necessarily flows in the opposite flow direction to the flow direction of the indoor air, that is, counterflow is necessarily achieved. Thus, the temperature difference between the refrigerant and the indoor air, which is a heat use medium, in the heat exchanger is reduced, and the heat exchange efficiency can thus be improved. In addition, by closing the opening and closing device 52 provided at the return pipe 4c to allow high-pressure liquid refrigerant to flow through the return pipe 4b only, the rate of the refrigerant that circulates in the refrigerant cycle circuit in the air-conditioning apparatus 100 can be reduced in the heating operation mode.

REFERENCE SIGNS LIST

1: outdoor unit, 2: relay unit, 3, 3a, 3b: indoor unit, 4a: supply pipe, 4b, 4c: return pipe, 5: heat medium pipe, 11: compressor, 12: first flow switching device, 13: heat-source-side heat exchanger, 14: second flow switching device, 15: first expansion device, 16: third expansion device, 17a, 17b: opening and closing device, 18: fourth expansion device, 19: accumulator, 21a, 21b: intermediate heat exchanger, 22a, 22b: pump, 23a, 23b, 23c, 23d: heat-medium flow switching device, 24a, 24b, 25a, 25b: heat-medium temperature sensor, 26, 26a, 26b, 26c, 26d: refrigerant flow switching device, 27: gas-liquid separator, 28a, 28b: refrigerant-to-refrigerant heat exchanger, 29: check valve, 31a, 31 b: use-side heat exchanger, 32a, 32b: heat-medium flow adjustment device, 34a, 34b: inlet-side temperature sensor, 35a, 35b: outlet-side temperature sensor, 36a, 36b: first indoor expansion device, 37a, 37b: second indoor expansion device, 40: bypass circuit, 41: second expansion device, 42: refrigerant-to-refrigerant heat exchanger, 50: controller, 52: opening and closing device, 61*a*, 61 *b*: heat-medium supply pipe, 62*a*, 62*b*: heat-medium return pipe, 71: discharge temperature sensor, 72: suction temperature sensor, 73: high-pressure detection sensor, 74: low-pressure detection sensor, 75: outdoor air temperature sensor, 76: refrigerant-to-refrigerant heat exchanger outlet-temperature sensor, 81, 82, 83, 84: refrigerant temperature sensor, 100: air-conditioning apparatus, 131: outdoor fan, 311*a*, 311*b*: indoor fan

The invention claimed is:

1. An air-conditioning apparatus comprising:
a heat source unit configured to generate a heating energy or a cooling energy and transfer the heating energy or the cooling energy to refrigerant;
a heat-use unit configured to cause the refrigerant to transfer the heating energy or the cooling energy transferred from the heat source unit to a heat load through heat exchange between the refrigerant and the heat load;
a supply pipe connecting the heat source unit and the heat-use unit to allow the refrigerant to flow from the heat source unit to the heat-use unit;
a plurality of return pipes arranged parallel to each other, the return pipes connecting the heat source unit and the heat-use unit to allow the refrigerant to flow therein from the heat-use unit to the heat source unit during both of a cooling operation and a heating operation;
an opening and closing device provided at at least one of the return pipes, and configured to control a flow rate of refrigerant that passes through the return pipe; and
a controller circuit configured to open the opening and closing device in the cooling operation, and close the opening and closing device in the heating operation.

2. The air-conditioning apparatus of claim 1, wherein
the heat source unit includes: a compressor configured to compress and discharge the refrigerant; a heat-source-side heat exchanger configured to cause heat exchange to be performed between the refrigerant and a heat-source fluid; a first flow switching device and a second flow switching device that are configured to switch respective flow passages for the refrigerant between a plurality of flow passages, and a first expansion device configured to reduce a pressure of the refrigerant,
the controller controls each of the first flow switching device and the second flow switching device to switch an associated one of the flow passages in the heat source unit,
such that in a cooling operation, each of the first flow switching device and the second flow switching device switches the associated flow passage to a flow passage in which the refrigerant flows through the compressor, the first flow switching device, the heat-source-side heat exchanger, the first expansion device, the second flow switching device, and the first flow switching device in this order, then after passing through the supply pipe and the return pipes, flows through the second flow switching device, and returns to the compressor, and
such that in a heating operation, each of the first flow switching device and the second flow switching device switches the associated flow passage to a flow passage in which the refrigerant flows through the compressor and the first flow switching device in this order, then after passing through the supply pipe and the return pipes, flows through the second flow switching device, the first expansion device, the first flow switching device, the heat-source-side heat exchanger, and the second flow switching device, and returns to the compressor.

3. The air-conditioning apparatus of claim 2, further comprising:
a bypass circuit that is a pipe having ends one of which is connected to a pipe connecting the second flow switching device and the first expansion device and the other of which is connected to a pipe connecting the second flow switching device and the compressor;
a second expansion device provided at the bypass circuit, and configured to adjust a flow rate of the refrigerant; and
a refrigerant-to-refrigerant heat exchanger configured to cause heat exchange to be performed between the refrigerant that passes through the second expansion device and flows in the bypass circuit and the refrigerant that flows from the second flow switching device to the first flow switching device.

4. The air-conditioning apparatus of claim 1, wherein the return pipes are formed such that the at least one of the return pipes at which the opening and closing device is provided has a pipe diameter different from that of a remaining one or ones of the return pipes at which the opening and closing device are not provided.

5. The air-conditioning apparatus of claim 1, wherein the at least one of the return pipes on which the opening and closing device is provided is provided with a check valve.

6. The air-conditioning apparatus of claim 1, wherein the refrigerant is a zeotropic refrigerant mixture.

7. The air-conditioning apparatus of claim 1, wherein
the heat-use unit includes a heat-medium cycle circuit in which an intermediate heat exchanger, a pump, one or more use-side heat exchangers, and a heat-medium flow adjustment device are connected to circulate the heat medium, the intermediate heat exchanger being connected to the supply pipe and the return pipes and configured to cause heat exchange to be performed between the refrigerant and a heat medium that is not refrigerant, the pump being configured to send the heat medium, the one or more use-side heat exchangers being configured to cause heat exchange to be performed between the heat medium and air related to an air-conditioned space, the heat-medium flow adjustment device being provided for the one or more use-side heat exchangers and configured to adjust a flow rate of the heat medium that passes through the one or more use-side heat exchangers, and
the pump is provided to face such that the pump sends the heat medium in the opposite direction to a flow direction of the refrigerant in the intermediate heat exchanger.

8. The air-conditioning apparatus of claim 1, wherein
the heat-use unit includes a heat-medium cycle circuit and a refrigerant flow-rate adjustment device configured to adjust a pressure and a flow rate of the refrigerant,
in the heat medium cycle circuit, a first intermediate heat exchanger and a second intermediate heat exchanger, a first pump and a second pump, one or more use-side heat exchangers, a plurality of heat-medium flow switching devices are connected to circulate the heat medium, the first intermediate heat exchanger and the second intermediate heat exchanger being configured to cause heat exchange to be performed between the refrigerant and a heat medium that is not refrigerant, the first pump and the second pump being provided for the first intermediate heat exchanger and the second intermediate heat exchanger, respectively, and being configured to send the heat medium, the one or more use-side heat exchangers being configured to cause heat exchange to be performed between the heat medium and air related to an air-conditioned space, the plurality of heat-medium flow switching devices being provided between the one or more use-side heat exchangers and the first intermediate heat exchanger and the second intermediate heat exchanger, and being configured to switch respective circulation passages for the heat medium, pipes through which the refrigerant flows are connected to the supply pipe, the first intermediate heat exchanger, the refrigerant flow-rate adjustment device, the second intermediate heat exchanger, and the return pipes in this order, and the first pump and the second pump are provided to face such that the first pump and the second pump send the heat medium in the opposite direction to a flow direction of the refrigerant in the first intermediate heat exchanger and the second intermediate heat exchanger, respectively.

9. The air-conditioning apparatus of claim 1, wherein the heat-use unit includes one or more use-side heat exchangers configured to cause heat exchange to be performed between the refrigerant and air related to an air-conditioned space, a first indoor expansion device provided on a refrigerant inlet side of the one or more use-side heat exchangers, and configured to adjust a pressure and a flow rate of the refrigerant, and a second indoor expansion device provided on a refrigerant outlet side of the one or more use-side heat exchangers, and configured to adjust a pressure and a flow rate of the refrigerant.

10. The air-conditioning apparatus of claim 1, wherein the heat-use unit includes a gas-liquid separator configured to separate gas refrigerant of the refrigerant and liquid refrigerant of the refrigerant from each other, a refrigerant flow-rate adjustment device configured to reduce a pressure of the refrigerant that passes therethrough, and configured to adjust a flow rate of refrigerant, a refrigerant-to-refrigerant heat exchanger configured to cause heat exchange to be performed between liquid refrigerant of the refrigerant and the refrigerant that passes through the refrigerant flow-rate adjustment device, thereby subcooling the liquid refrigerant, one or more use-side heat exchangers configured to cause heat exchange to be performed between the refrigerant and air related to an air-conditioned space, a first indoor expansion device provided on a refrigerant inlet side of the one or more use-side heat exchangers, and configured to adjust a pressure and a flow rate of the refrigerant, a second indoor expansion device installed on a refrigerant outlet side of the one or more use-side heat exchangers, and configured to adjust a pressure and a flow rate of the refrigerant, and a plurality of refrigerant flow switching devices configured to switch respective flow passages depending on a state of the refrigerant to be made to flow into the one or more use-side heat exchangers.

11. The air-conditioning apparatus of claim 2, wherein the return pipes are formed such that the at least one of the return pipes at which the opening and closing device is provided has a pipe diameter different from that of a remaining one or ones of the return pipes at which the opening and closing device are not provided.

12. The air-conditioning apparatus of claim 3, wherein the return pipes are formed such that the at least one of the return pipes at which the opening and closing device is provided has a pipe diameter different from that of a remaining one or ones of the return pipes at which the opening and closing device are not provided.

13. The air-conditioning apparatus of claim 2, wherein the at least one of the return pipes on which the opening and closing device is provided is provided with a check valve.

14. The air-conditioning apparatus of claim 3, wherein the at least one of the return pipes on which the opening and closing device is provided is provided with a check valve.

15. The air-conditioning apparatus of claim 4, wherein the at least one of the return pipes on which the opening and closing device is provided is provided with a check valve.

16. The air-conditioning apparatus of claim 2, wherein the refrigerant is a zeotropic refrigerant mixture.

17. The air-conditioning apparatus of claim 3, wherein the refrigerant is a zeotropic refrigerant mixture.

18. The air-conditioning apparatus of claim 4, wherein the refrigerant is a zeotropic refrigerant mixture.

19. The air-conditioning apparatus of claim 5, wherein the refrigerant is a zeotropic refrigerant mixture.

20. An air-conditioning apparatus comprising:

an outdoor unit including a compressor and configured to generate a heating energy or a cooling energy and transfer the heating energy or the cooling energy to refrigerant;

an indoor unit including a heat exchanger and configured to cause the refrigerant to transfer the heating energy or the cooling energy transferred from the outdoor unit to a heat load through heat exchange between the refrigerant and the heat load;

a supply pipe connecting the outdoor unit and the indoor unit to allow the refrigerant to flow from the outdoor unit to the indoor unit;

a plurality of return pipes arranged parallel to each other, the return pipes connecting the outdoor unit and the indoor unit to allow the refrigerant to flow therein from the indoor unit to the outdoor unit during both of a cooling operation and a heating operation;

an opening and closing device provided at at least one of the return pipes, and configured to control a flow rate of refrigerant that passes through the return pipe; and a controller circuit configured to open the opening and closing device in a cooling operation, and close the opening and closing device in a heating operation.

* * * * *